(12) United States Patent
Lu et al.

(10) Patent No.: US 12,101,045 B2
(45) Date of Patent: *Sep. 24, 2024

(54) SYSTEMS AND METHODS FOR IDENTIFYING A MAGNETIC MOVER

(71) Applicant: Planar Motor Incorporated, Vancouver (CA)

(72) Inventors: Xiaodong Lu, Vancouver (CA); Yao Kevin Xiao, White Rock (CA)

(73) Assignee: Planar Motor Incorporated, British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,923

(22) Filed: Dec. 23, 2022

(65) Prior Publication Data

US 2023/0129387 A1   Apr. 27, 2023

Related U.S. Application Data

(63) Continuation of application No. 17/272,715, filed as application No. PCT/CA2019/051429 on Oct. 4, 2019, now Pat. No. 11,575,337.

(Continued)

(51) Int. Cl.
*H02P 25/064* (2016.01)
*H02K 11/225* (2016.01)
(Continued)

(52) U.S. Cl.
CPC .......... *H02P 25/064* (2016.02); *H02K 11/225* (2016.01); *H02K 41/031* (2013.01);
(Continued)

(58) Field of Classification Search
CPC .......... H02P 25/064; H02P 6/006; H02P 6/16; H02K 11/225; H02K 41/031;
(Continued)

(56) References Cited

U.S. PATENT DOCUMENTS

| | | | |
|---|---|---|---|
| 3,376,578 | A | 4/1968 | Sawyer |
| 4,535,278 | A | 8/1985 | Asakawa |

(Continued)

FOREIGN PATENT DOCUMENTS

| | | |
|---|---|---|
| CN | 108574378 A | 9/2018 |
| DE | 102016218777 A1 | 5/2017 |

(Continued)

OTHER PUBLICATIONS

W.J. Kim and D.L. Trumper, High-precision magnetic levitation stage for photolithography. Precision Eng. 22 2 (1998), pp. 66-77.

(Continued)

*Primary Examiner* — David Luo
(74) *Attorney, Agent, or Firm* — D'Ambrosio & Menon, PLLC; Usha Menon

(57) ABSTRACT

A system is described in which a magnetic mover includes at least one mover identification device. The system also includes a stator defining a work surface and including an actuation coil assembly and at least one stator identification device operable to interact with the at least one mover identification device. One or more sensors are used to sense a position of the first magnetic mover. One or more stator driving circuits are used to drive the actuation coil assembly to thereby move the first magnetic mover over the work surface. The first magnetic mover includes one or more magnetic components positioned such that interaction of one or more magnetic fields emitted by the one or more magnetic components with one or more magnetic fields generated by the actuation coil assembly when driven by the one or more stator driving circuits enables movement of the first magnetic mover in at least two degrees of freedom.

36 Claims, 22 Drawing Sheets

Related U.S. Application Data

(60) Provisional application No. 62/745,290, filed on Oct. 13, 2018, provisional application No. 62/786,553, filed on Dec. 31, 2018.

(51) Int. Cl.
  *H02K 41/03* (2006.01)
  *H02P 6/00* (2016.01)
  *H02P 6/16* (2016.01)

(52) U.S. Cl.
  CPC ............... *H02P 6/006* (2013.01); *H02P 6/16* (2013.01); *H02K 2201/18* (2013.01)

(58) Field of Classification Search
  CPC .... H02K 2201/18; H02K 11/21; H02K 11/35; H02K 2213/03
  USPC .................................. 318/135, 687, 671, 560
  See application file for complete search history.

(56) References Cited

U.S. PATENT DOCUMENTS

| | | | |
|---|---|---|---|
| 4,654,571 A | 3/1987 | Hinds | |
| 5,334,892 A | 8/1994 | Chitayat | |
| 6,003,230 A | 12/1999 | Trumper et al. | |
| 6,005,309 A | 12/1999 | Chitayat | |
| 6,069,418 A | 5/2000 | Tanaka | |
| 6,097,114 A | 8/2000 | Hazelton | |
| 6,208,045 B1 | 3/2001 | Hazelton et al. | |
| 6,252,234 B1 | 6/2001 | Hazelton et al. | |
| 6,304,320 B1 | 10/2001 | Tanaka et al. | |
| 6,339,266 B1 | 1/2002 | Tanaka | |
| 6,441,514 B1 | 8/2002 | Markle | |
| 6,445,093 B1 | 9/2002 | Binnard | |
| 6,452,292 B1 | 9/2002 | Binnard | |
| 6,495,934 B1 | 12/2002 | Hayashi et al. | |
| 6,720,680 B1 | 4/2004 | Tanaka | |
| 6,777,896 B2 | 8/2004 | Teng | |
| 6,835,941 B1 | 12/2004 | Tanaka | |
| 6,847,134 B2 | 1/2005 | Frissen et al. | |
| 6,885,430 B2 | 4/2005 | Tanaka et al. | |
| 6,987,335 B2 | 1/2006 | Korenaga | |
| 7,075,198 B2 | 7/2006 | Korenaga | |
| 7,224,252 B2 | 5/2007 | Meadow, Jr. et al. | |
| 7,227,284 B2 | 6/2007 | Korenaga | |
| 7,436,135 B2 | 10/2008 | Miyakawa | |
| 7,696,653 B2 | 4/2010 | Tanaka | |
| 7,808,133 B1 | 10/2010 | Widdowson et al. | |
| 7,948,122 B2 | 5/2011 | Compter et al. | |
| 8,031,328 B2 | 10/2011 | Asano et al. | |
| 8,796,959 B2* | 8/2014 | Sato ...................... | H02P 25/064 318/135 |
| 9,202,719 B2 | 12/2015 | Lu et al. | |
| 9,812,939 B2* | 11/2017 | Kumazawa ............ | H02P 25/06 |
| 10,454,355 B2 | 10/2019 | Weber et al. | |
| 10,594,245 B2 | 3/2020 | Plainer et al. | |
| 2004/0140780 A1 | 7/2004 | Cahill et al. | |
| 2008/0203828 A1 | 8/2008 | Compter et al. | |
| 2014/0285122 A1 | 9/2014 | Lu et al. | |
| 2017/0179806 A1 | 6/2017 | Lu | |
| 2017/0294827 A1 | 10/2017 | Rubin | |

FOREIGN PATENT DOCUMENTS

| | | |
|---|---|---|
| DE | 102017003120 A1 | 10/2018 |
| EP | 0446378 A1 | 9/1991 |
| EP | 3285046 A1 | 2/2018 |
| JP | 2011050225 A | 3/2011 |
| KR | 101210255 B1 | 12/2012 |
| WO | 2013059934 A1 | 5/2013 |
| WO | 2014055335 A1 | 4/2014 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017121127 A1 | 7/2017 |
| WO | 2017142481 A1 | 8/2017 |
| WO | 201817613 A1 | 10/2018 |
| WO | 2018176137 A1 | 10/2018 |

OTHER PUBLICATIONS

D.L. Trumper, et al, "Magnet arrays for synchronous machines", IEEE Industry Applications Society Annual Meeting, vol. 1, pp. 9-18, 1993.

J.W. Jansen, C.M.M. van Lierop, E.A. Lomonova, A.J.A. Vandenput, "Magnetically Levitated Planar Actuator with Moving Magnets", IEEE Tran. Ind. App., vol. 44, No. 4, 2008.

Cho, H.S., Im, C.H., Jung, H.K., 2001, Magnetic Field Analysis of 2-D Permanent Magnet Array for Planar Motor, IEEE Tran. On Magnetics, vol. 37 No. 5, pp. 3762-3766.

Filho, A.F.F., 2001, Investigation of the Forces Produced by a New Electromagnetic Planar Actuator, Electric Machines and Drives Conference, 2001. IEMDC 2001. IEEE International, pp. 8-13.

Filho, A.F., 2010, Analysis of a DC XY-Actuator, XIX International Conference on Electrical Machines—ICEM 2010, Rome.

Filho, A.F., 1999, Development of a novel planar actuator, Ninth International Conference on Electrical Machines and Drives, Conference Publication No. 468.

Fujii, N., Okinaga, K., 2002, X-Y Linear Synchronous Motors Without Force Ripple and Core Loss for Precision Two-Dimensional Drives, IEEE Transactions on Magnetics, vol. 38, No. 5, Sep. 2002.

Buckley, J.D., Galburt, D.N., Karatzas, C., 1989, Step-and-scan lithography using reduction optics, J. Vac. Sci. Techno!. B 7 (6), Nov./Dec. 1989.

Hesse, S., Schaeffel, C., Katzschmann, M., 2011, Interferometric Controlled Planar Nanopositioning System With 100 MM Circular Travel Range, ASPE 2011 Annual Meeting, Denver, Co.

Tomita, Y., Koyanagawa, Y., 1995, Study on a surface-motor driven precise positioning system, Journal of Dynamic Systems, Measurement, and Control Sep. 1995, vol. 117/311-319.

Jeda, Y., Ohsaki, H., 2008, A planar actuator with a small mover traveling over large yaw and translational dispalcements, IEEE Transactions on Magnetics, vol. 44, No. 5, May 2008.

Kajiyama, H., Suzuki, K., Dohmeki, H., 2010, Development of ironless type surface motor, XIX International Conference on Electrical Machines—ICEM 2010, Rome.

Shinno, H., Yoshioka, H., Taniguchi, K., 2007, A Newly Developed Linear Motor-Driven Aerostatic X-Y Planar Motion Table System for Nano-Machining, Annals of the CIRP, 56/1:369-372.

Gao, W., Dejima, S., Yanai, H., Katakura, K., Kiyono, S., Tomita, Y., 2004, A surface motor-driven planar motion stage Integrated with an XYθZ surface encoder for precision positioning, Precision Engineering, 28/3:329-337.

In, W., Lee, S., Jeong, J., Kim, J., 2008, Design of a planar-type high speed parallel mechanism positioning platform with the capability of 180 degrees orientation, Annals of the CIRP 57/1:421-424.

Lee, K., Roth, R., Zhou, J., 1996, Dynamic Modeling and Control of a Ball-Joint-Like Variable-Reluctance Spherical Motor, Journal of Dynamic Systems, Measurement, and Control, 118/1:29-40.

Weck, M., Reinartz, T., Henneberger, G., Doncker, R., 2000, Design of a Spherical Motor with Three Degrees of Freedom, Annals of the CIRP, 49/1:289-294.

Hollis, R., Salcudean, S., Allan, A., 1991, A six-degree-of-freedom magnetically levitated variable compliance fine-motion wrist: Design, modeling, control, IEEE Trans. Robot. Automat, 7/3:320-332.

Verma, S., Kim, W., Gu, J., 2004, Six-axis nanopositioning device with precision magnetic levitation technology, IEEE Tran. On Mechatronics 9/2 384-391.

Holmes, M., Hocken, R., Trumper, D., 2000, The Long-Range Scanning Stage: a Novel Platform for Scanned-Probe Microscopy, Precision Engineering, 24/3:191-209.

Etxaniz, I., Izpizua, A., SanMartin, M., Arana, J., 2006, Magnetic Levitated 2D Fast Drive, IEEJ Transactions on Industry Applications, 126/12:1678-1681.

(56) References Cited

OTHER PUBLICATIONS

Compter, J., 2003, Electro-dynamic planar motor, Precision Engineering, 28/2: 171-180.
Jansen, J., van Lierop, C., Lomonova, E., Vandenput, A., 2007, Modeling of magnetically levitated planar actuators with moving magnets, IEEE Tran. Magnetic, 43/1:15-25.
B&R Industrial Automation; "ACOPOStrak: Track design flexibility [sub: EN, DA, JA]" Feb. 27, 2018 <https://www.youtube.com/watch?v=4SfsZCa419A> https://www.br-automation.com/en/products/versatile-transport-systems/acopostrak/.
Festo Automation; "Multi-Carrier-System"Mar. 13, 2015 <https://www.youtube.com/watch?v=8mb8jyUDtXo> https://www.festo.com/cms/de_de/56286.htm.
Extended European Search Report, Dec. 4, 2020.

\* cited by examiner

SYSTEMS AND METHODS FOR IDENTIFYING A MAGNETIC MOVER

CROSS REFERENCE TO RELATED APPLICATION(S)

This application is a continuation of U.S. patent application Ser. No. 17/272,715 filed on Mar. 2, 2021, which is a U.S. National Stage entry of PCT/CA2019/051429 filed on Oct. 4, 2019, which claims priority to provisional Patent Application No. 62/745,290 filed on Oct. 13, 2018 and provisional Patent Application No. 62/786,553 filed on Dec. 31, 2018, the contents of which are incorporated by reference herein.

TECHNICAL FIELD

The present disclosure relates to systems and methods for identifying a magnetic mover.

BACKGROUND TO THE DISCLOSURE

Motion stages (e.g. XY tables and rotary tables) are widely used in various manufacturing, inspection, and assembling processes. A common solution currently in use achieves XY motion by stacking together two linear stages (e.g. an X-stage and a Y-stage) via connecting bearings. A more desirable solution involves having a single moving stage capable of XY motion, eliminating the need for additional bearings. It might also be desirable for such a moving stage to be able to provide at least some Z motion. Attempts have been made to design such displacement devices using the interaction between current-carrying coils and permanent magnets. For example, a magnetic mover may be displaced relative to stator operable to generate one or more magnetic fields.
One problem with such systems, however, is that it may be difficult for a controller of the stator to distinguish one mover on the stator from other movers on the stator.

SUMMARY OF THE DISCLOSURE

Generally, according to embodiments of the disclosure, there is described a system comprising one or more magnetic movers and one or more stators. A stator defines a work surface, for example a 2D planar work surface, and comprises an actuation coil assembly for driving movement of the one or more magnetic movers over the work surface. The stator comprises at least one stator identification device which in some embodiments is a first magnetically responsive unit ($1^{st}$ MRU). A magnetic mover comprises at least one mover identification device, which in some embodiments is a second magnetically responsive unit ($2^{nd}$ MRU). The $1^{st}$ and $2^{nd}$ MRUs, and more generally the stator identification device and the mover identification device, are operable to interact with one another, for example through magnetic induction. According to some embodiments, rather than using magnetic induction, interaction between the stator identification device and the mover identification device may be active rather than passive. For example, the stator identification device may initiate communication with the mover identification device and request that the mover identification device transmit identification or other information to the stator identification device. Alternatively, the mover identification device may periodically transmit identification or other information to the stator identification device, for example.

The system may further comprise one or more sensors for sensing a position of the magnetic mover. Based on the position of the magnetic mover, a controller may control one or more stator driving circuits to drive the actuation coil assembly to thereby move the magnetic mover over the work surface. In particular, the actuation coil assembly may interact with one or more magnetic components (such as one or more magnet arrays) on the mover to cause movement of the mover over the work surface. The movement may be in at least two or more degrees of freedom, for example in the x and y directions.

According to a first aspect of the disclosure, there is provided a system comprising: at least one magnetic mover including a first magnetic mover, wherein the first magnetic mover comprises at least one mover identification device; a stator defining a work surface and comprising: an actuation coil assembly comprising a plurality of actuation coils; and at least one stator identification device operable to interact with the at least one mover identification device; one or more sensors for sensing a position of the first magnetic mover; and one or more stator driving circuits for driving the actuation coil assembly to thereby move the first magnetic mover over the work surface, wherein the first magnetic mover comprises one or more magnetic components positioned such that interaction of one or more magnetic fields emitted by the one or more magnetic components with one or more magnetic fields generated by the actuation coil assembly when driven by the one or more stator driving circuits enables movement of the first magnetic mover in at least two degrees of freedom.

The work surface may separate the first magnetic mover from one or more of the actuation coil assembly and the at least one stator identification device.

The at least two degrees of freedom may comprise orthogonal x-axis and y-axis degrees of freedom.

The work surface may extend in an x-y plane.

The one or more magnetic components may be a first magnetically responsive unit.

The at least one stator identification device may be a stator coupling coil assembly.

The at least one mover identification device may be a second magnetically responsive unit.

The at least one mover identification device may comprise at least one mover inductive coil.

The at least one stator identification device may comprise at least one stator coupling coil.

The stator further may comprise one or more coupling coil driving circuits for driving the at least one stator coupling coil.

One or more of a shape and a geometry of the at least one stator coupling coil may be different from a respective one or more of a shape and a geometry of the plurality of actuation coils.

When a current is driven through the at least one stator coupling coil, the at least one stator coupling coil may be configured to magnetically couple with at least one mover inductive coil of the at least one mover identification device.

The one or more stator driving circuits may be operable to drive the plurality of actuation coils at one or more frequencies different from one or more frequencies used to operate the at least one stator identification device, for reducing interference between the plurality of actuation coils and the at least one stator identification device.

The at least two degrees of freedom may comprise orthogonal x-axis, y-axis, and z-axis degrees of freedom, and respective rotational degrees of freedom about the x-axis, the y-axis, and the z-axis.

The at least one mover identification device may comprise a plurality of mover identification devices.

The system may further comprise a controller communicatively coupled to the one or more sensors and operable to perform a method comprising: activating the one or more stator driving circuits to drive the actuation coil assembly so as to move the first magnetic mover over the work surface to a sensing position associated with a stator identification device of the at least one stator identification device; and activating the stator identification device for enabling interaction between the stator identification device and the at least one mover identification device.

The method may further comprise, after activating the stator identification device, identifying the first magnetic mover based on identification information transmitted from the at least one mover identification device to the stator identification device.

The method may further comprise determining an orientation of the first magnetic mover based on the transmitted identification information. The orientation may be an Rz orientation range.

The sensing position may comprise a position that is sufficiently close to the stator identification device so as to permit, for at least one orientation of the first magnetic mover, data transfer between the at least one mover identification device and the stator identification device.

Activating the stator identification device for enabling interaction between the stator identification device and the at least one mover identification device may comprise: activating the stator identification device; thereafter, determining whether identification information has been transferred from the at least one mover identification device to the stator identification device; and if not, then adjusting a position of the first magnetic mover.

Adjusting the position of the first magnetic mover may comprise translating the first magnetic mover to a new sensing position associated with the stator identification device.

The method may further comprise determining an orientation of the first magnetic mover based on identification information transmitted from the at least one mover identification device to the stator identification device, and based on the adjusted position of the first magnetic mover.

The at least one mover identification device may comprise a plurality of mover identification devices, each mover identification device being associated with unique identification information for the first magnetic mover, and the method may further comprise: determining an orientation of the first magnetic mover based on identification information transmitted from at least one mover identification device of the plurality of mover identification devices to the stator identification device.

The at least one mover identification device may comprise a plurality of mover identification devices positioned such that, when the first magnetic mover is in a sensing position associated with a stator identification device of the at least one stator identification device, at least one mover identification device of the plurality of mover identification devices is sufficiently close to the stator identification device so as to permit data transfer between the at least one mover identification device and the stator identification device.

The at least one stator identification device may comprise a plurality of stator identification devices positioned such that, when the first magnetic mover is in a sensing position associated with a stator identification device of the plurality of stator identification devices, the at least one mover identification device is sufficiently close to the stator identification device so as to permit data transfer between the at least one mover identification device and the stator identification device.

The at least one mover identification device may be associated with identification information uniquely identifying the first magnetic mover.

A center of the at least one mover identification device may be offset from a center of the one or more magnetic components of the first magnetic mover.

The at least one stator identification device may have a size such that, for at least one position of the first magnetic mover on or over the work surface, at least a portion of the at least one mover identification device overlaps with at least a portion of the at least one stator identification device.

The one or more magnetic components may comprise multiple magnet arrays, each magnet array comprising multiple linearly elongated magnetization segments defining a direction of elongation, and an axial direction of a magnetic core of the at least one mover identification device may be aligned with the direction of elongation defined by the linearly elongated magnetization segment closest to the at least one mover identification device.

Each magnetization segment may have a magnetization direction, and the axial direction of the magnetic core of the at least one mover identification device may be orthogonal to the magnetization direction of the magnetization segment closest to the magnetic core.

The at least one mover identification device may comprise a magnetic core, the one or more magnetic components may comprise multiple magnet arrays comprising a plurality of linearly elongated magnetization segments, the linearly elongated magnetization segment closest to the at least one mover identification device may have first and second ends, and: a distance separating the first end from a center of the magnetic core in an axial direction of the magnetic core may be greater than a length of the magnetic core; and a distance separating the second end from the center of the magnetic core in the axial direction of the magnetic core may be greater than the length of the magnetic core.

The at least one mover identification device may comprise a magnetic core, the one or more magnetic components may comprise multiple magnet arrays comprising a plurality of linearly elongated magnetization segments, the linearly elongated magnetization segment closest to the at least one mover identification device may have first and second ends, and: a distance separating the first end from a center of the magnetic core in an axial direction of the magnetic core may be greater than about ⅓ of a distance separating the first end from the second end; and a distance separating the second end from the center of the magnetic core in the axial direction of the magnetic core may be greater than about ⅓ of the distance separating the first end from the second end.

The first magnetic mover may comprise a magnetic robotic device carrying a workpiece, and the at least one mover identification device may be comprised in the workpiece.

The one or more magnetic components may comprise multiple magnet arrays surrounding the at least one mover identification device.

The at least one mover identification device may comprise an inductive coil wound about a magnetic core.

The at least one mover identification device may comprise a storage component storing identification information identifying the first magnetic mover.

According to a further aspect of the disclosure, there is provided a method comprising: providing a system comprising: at least one magnetic mover comprising a first magnetic mover, wherein the first magnetic mover comprises at least one mover identification device; a stator defining a work surface and comprising: an actuation coil assembly comprising a plurality of actuation coils; and at least one stator identification device; and one or more stator driving circuits for driving the actuation coil assembly; transferring identification information from the at least one mover identification device to the at least one stator identification device; and identifying the first magnetic mover based on the identification information, wherein the first magnetic mover comprises one or more magnetic components positioned such that interaction of one or more magnetic fields emitted by the one or more magnetic components with one or more magnetic fields generated by the actuation coil assembly when driven by the one or more stator driving circuits enables movement of the first magnetic mover in at least two degrees of freedom.

The method may further comprise determining with one or more sensors a position of the first magnetic mover.

The work surface may separate the first magnetic mover from one or more of the actuation coil assembly and the at least one stator identification device.

The at least one mover identification device may comprise at least one mover inductive coil, and the at least one stator identification device may comprise at least one stator coupling coil.

When a current is driven through the at least one stator coupling coil and/or at least one mover inductive coil of the at least one mover identification device, the one or more stator driving circuits may not drive a current through the plurality of actuation coils, in order to minimize interference from the plurality of actuation coils with the at least one stator coupling coil and/or the at least one mover inductive coil.

Transferring the identification information may comprise transferring the identification information using electromagnetic induction.

The stator may further comprise one or more coupling coil driving circuits for driving the at least one stator coupling coil.

The method may further comprise, prior to identifying the first magnetic mover, activating the one or more stator driving circuits to drive the actuation coil assembly so as to move the first magnetic mover over the work surface to a sensing position associated with a stator identification device of the at least one stator identification device; and activating the stator identification device for enabling interaction between the stator identification device and the at least one mover identification device.

The method may further comprise determining an orientation of the first magnetic mover based on the transmitted identification information.

Activating the stator identification device for enabling interaction between the stator identification device and the at least one mover identification device may comprise: activating the stator identification device; thereafter, determining whether the identification information has been transferred from the at least one mover identification device to the stator identification device; and if not, then adjusting a position of the first magnetic mover.

Adjusting the position of the first magnetic mover may comprise translating the first magnetic mover to a new sensing position associated with the stator identification device.

The method may further comprise determining an orientation of the first magnetic mover based on the identification information transmitted between the at least one mover identification device and the stator identification device, and based on the adjusted position of the first magnetic mover.

The at least one mover identification device may comprise a plurality of mover identification devices, each mover identification device being associated with unique identification information for the first magnetic mover, and the method may further comprise: determining an orientation of the first magnetic mover based on identification information transmitted from at least one mover identification device of the plurality of mover identification devices to the stator identification device.

The first magnetic mover may comprise a magnetic robotic device carrying a workpiece, the at least one mover identification device may be comprised in the workpiece, and identifying the first magnetic mover comprises identifying the workpiece may be based on the identification information.

The method may further comprise, when the at least one stator identification device is used to communicate with the at least one mover identification device, optimizing a Z-direction distance between the first magnetic mover and the work surface to strengthen a coupling between the at least one mover identification device and the at least one stator identification device, wherein the Z-direction distance may include a nil distance.

According to a further aspect of the disclosure, there is provided a computer-readable medium comprising computer program code configured when executed by one or more processors to cause the one or more processors to perform any of the herein-described methods.

According to a further aspect of the disclosure, there is provided a magnetic mover comprising: at least one identification device associated with identification information identifying the magnetic mover, the at least one identification device comprising at least one magnetic core; and magnet arrays comprising linearly elongated magnetization segments defining respective directions of elongation, wherein an axial direction of the at least one magnetic core is aligned with the direction of elongation defined by the linearly elongated magnetization segment closest to the at least one identification device.

The linearly elongated magnetization segment closest to the at least one identification device may have first and second ends, and: a distance separating the first end from a center of the at least one magnetic core in an axial direction of the at least one magnetic core may be greater than a length of the at least one magnetic core; and a distance separating the second end from the center of the at least one magnetic core in the axial direction of the at least one magnetic core may be greater than the length of the at least one magnetic core.

A center of the at least one identification device may be offset from a center of the magnetic mover.

The magnet arrays may surround the at least one identification device.

An axial direction of principal magnetic flux generated by the at least one identification device when a current is driving the at least one identification device may be orthogonal to magnetic fields at a center of the identification device emitted by the magnet array closest to the identification device.

The at least one identification device may comprise an inductive coil wound about the magnetic core.

The at least one identification device may comprise a storage component storing the identification information.

According to a further aspect of the disclosure, there is provided a stator comprising, positioned on a side of a work surface defined by the stator: an actuation coil assembly comprising a plurality of actuation coils; at least one coupling coil having one or more of a shape and a geometry different from a respective one or more of a shape and a geometry of the actuation coils; one or more stator driving circuits for driving the actuation coil assembly; and one or more coupling coil driving circuits for driving the at least one coupling coil.

The one or more stator driving circuits may be operable to drive the plurality of actuation coils at one or more frequencies different from one or more frequencies used by the one or more coupling coil driving circuits to drive the at least one coupling coil, for reducing interference between the plurality of actuation coils and the at least one coupling coil.

It will be appreciated that there are multiple applications where it may be desirable (e.g. for efficiency or any other suitable reason) why it might be advantageous to be able to achieve improved traceability and detect a mover's in-plane orientation. For example, a user may wish to mate a slender workpiece (carried by a mover) oriented in the positive X direction with a second workpiece located at an assembly station. However, if the mover is rotated by 90 or 180 degrees either manually or by an automation device, the carried workpiece will be oriented in the Y or in −X directions; when the rotated mover moves to the assembly station, it may not be possible for the second workpiece to mate with the carried workpiece.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION OF EMBODIMENTS

Figure 1A:
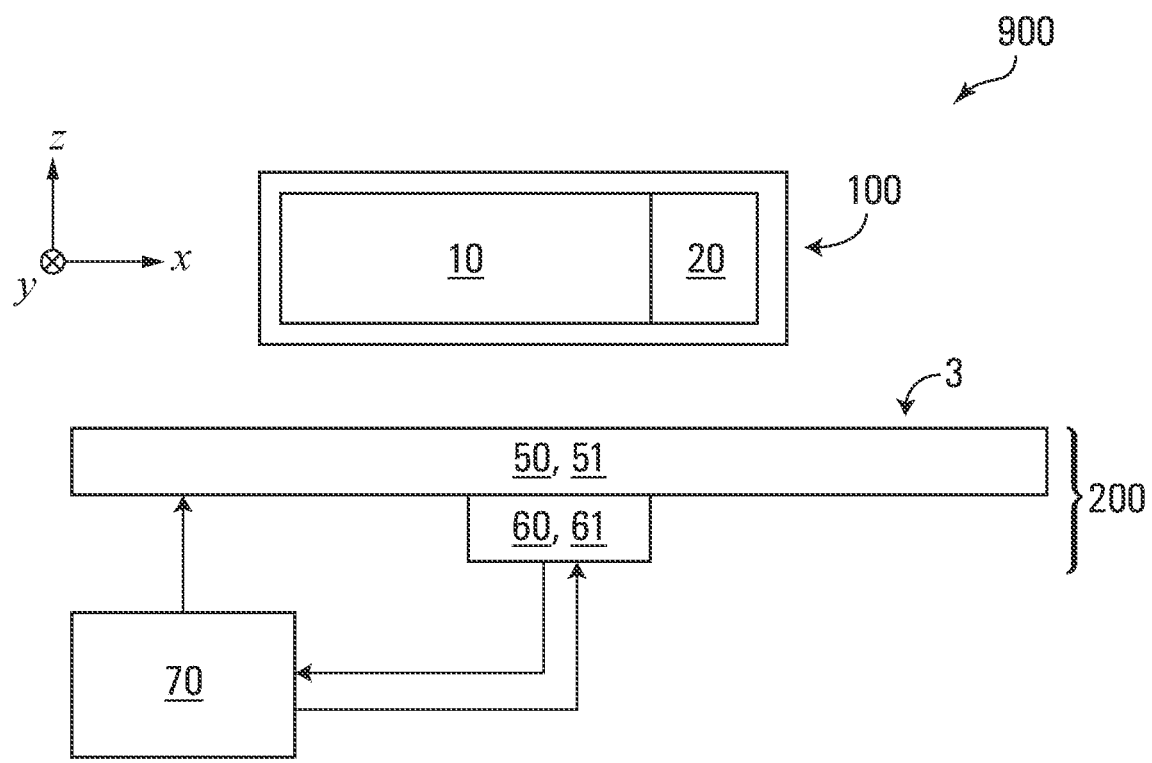
FIG. 1A shows a system including a mover, stator, and a controller, according to embodiments of the disclosure.

The present disclosure seeks to provide improved systems and methods for identifying a magnetic mover. While various embodiments of the disclosure are described below, the disclosure is not limited to these embodiments, and variations of these embodiments may well fall within the scope of the disclosure which is to be limited only by the appended claims.

Throughout the following description, specific details are set forth in order to provide a more thorough understanding to persons skilled in the art. However, elements well known in the prior art may not have been shown or described in detail to avoid unnecessarily obscuring the disclosure. Accordingly, the description and drawings are to be regarded in an illustrative, rather than a restrictive, sense.

According to some embodiments, robotic devices (or systems) are provided and which comprise one or more stators and one or more movers. Each mover may carry one or more workpieces or parts (workpieces and parts are used interchangeably throughout this disclosure). In some applications, a plurality of movers may carry one part holder, which may hold one or more parts. A "part" is a general term, and non-limiting examples include a component, a sample, or an assembly.

Generally, a stator and one or more movers may interact with each other via one or more magnetic fields so that the stator can provide forces and/or torques to the one or more movers to controllably move the one or more movers. In some embodiments, all movers in a system are substantially similar or nearly identical; however, this is not essential, and a system may comprise movers comprising magnet arrays of different size and/or configuration. In some embodiments, a stator may comprise a plurality of coils distributed in one or more planar layers. In some embodiments, a stator may further comprise a plurality of teeth, such as iron teeth.

The stator provides a work surface (which may have any of various suitable shapes, such as, flat, curved, cylindrical, or spherical), and each mover is able to move along, over, or on the work surface either in a contacting manner (via one or more contacting media such as sliding and/or rolling bearings, contact mode, or sitting mode) or without any contact by maintaining a controllable gap between a mover and a stator in a normal direction of the work surface. Such a gap may be maintained by passive or active levitation means.

Throughout this disclosure, moveable motion stages, moveable stages, motion stages, and movers are used interchangeably. Each mover may comprise one or more magnet assemblies. Each magnet assembly may comprise one or more magnet arrays rigidly connected together. Each magnet array may comprise one or more magnetization elements. Each magnetization element has a magnetization direction. Generally, magnets on a mover interact with stator coils via a working gap that is much smaller than a lateral dimension of the mover, i.e. a dimension parallel with the stator work surface.

In some embodiments, one or more amplifiers may be connected to drive a plurality of currents in the plurality of coils in the one or more stators. One or more controllers may be connected to deliver control signals to the one or more amplifiers. The control signals may be used to control current driven by the one or more amplifiers into at least some of the plurality of coils. The currents controllably driven into the at least some of the plurality of coils create magnetic fields which cause corresponding magnetic forces on the one or more magnet assemblies of a mover, thereby moving the mover relative to the stator (e.g. over or on the work surface) controllably in at least 2 in-plane degrees-of-freedom (DOF), or at least 3 in-plane DOFs, or at least 6 DOFs. In some embodiments, the magnetic forces associated with the interaction between the magnetic fields created by the currents in at least some of the coils and the magnetic fields associated with the magnet arrays may attract the moveable stage toward the stator when the controller is controlling the currents driven by the one or more amplifiers. In some embodiments, the magnetic forces associated with the interaction between the magnetic fields created by the currents in at least some of the coils and the magnetic fields associated with the magnet arrays may force the mover stage away from the stator to balance gravitational forces with an air gap when the controller is controlling the currents driven by the one or more amplifiers. In some embodiments, the gap between the movers and the stator is maintained by air bearings or compressed-fluid bearings.

In some embodiments, movers may work in levitation mode, i.e. movers may be levitated near the work surface without contacting the work surface either in a passive way or in an active way, and movers 100 may move along the work surface extending in X and Y directions, where X and Y are two in-plane, non-parallel directions. The separation gap between the work surface and a mover is generally much smaller than dimensions of the mover in both the X and the Y directions. Although in some embodiments movers are capable of 6 DOF controllable motion, this is not essential. In certain applications, where levitation of a mover may not be required and heavy load-carrying capability is more important, it will be understood by those of skill in the art that movers can sit on the work surface with proper mechanical bearings (including but not being limited to planar sliding bearings and ball transfer units), and are capable of three in-plane DOF controllable motion (translation in the X and Y directions, and rotation around the Z direction), where the X and Y directions are two in-plane, non-parallel direction, and the Z direction is normal to the work surface. When a mover relies on sliding and/or rolling bearings to sit on the work surface and the mover is capable of 3 in-plane DOF controllable motion (translation in the X and Y directions, and rotation around the Z direction), it is working in a 3-DOF controlled sitting mode. In some embodiments, a mover is capable of 3-DOF controllable motion (translation in the X and Y directions, and rotation around the Z direction) while working in levitation mode without contact with the stator; in this mode, translation in the Z direction, and rotation around the X and Y directions are open-loop controlled without feedback, using suitable passive levitation technology known to those of skill in the art. When a mover is capable of 3-DOF controllable motion without contact with the stator, it is working in a 3-DOF controlled levitation mode.

Generally, a stator working region is a two-dimensional (2D) area provided by the stator work surface, and movers can be controllably moved with at least two in-plane DOFs inside the stator working region, with suitable feedback control algorithms and suitable position feedback sensors.

For the purposes of describing the movers disclosed herein, it can be useful to define a pair of coordinate systems—a stator coordinate system which is fixed to the stator (e.g. to stator 200 of FIG. 1A); and a mover coordinate system which is fixed to the moveable stage (e.g. mover 100 of FIG. 1A) and moves with the mover relative to the stator and the stator coordinate system. This description may use conventional Cartesian coordinates (x, y, z) to describe these coordinate systems, although it will be appreciated that other coordinate systems could be used. For convenience and brevity, in this description and the associated drawings, the directions (e.g. x, y, z directions) in the stator coordinate system and the directions in the mover coordinate system may be shown and described as being coincident with one another—i.e. the stator-x (or Xs), stator-y (or Ys) and stator-z (or Zs) directions may be shown as coincident with the mover-x (or Xm), mover-y (Ym) and mover-z (or Zm) directions, respectively. Accordingly, this description and the associated drawings may refer to directions (e.g. x, y, and/or z) to refer to directions in both or either of the stator and mover coordinate systems. However, it will be appreciated from the context of the description herein that in some embodiments and/or circumstances, a mover (e.g. mover 100) may move relative to a stator (e.g. stator 200) such that these stator and mover directions are no longer coincident with one another. In such cases, this disclosure may adopt the convention of using the terms stator-x, stator-y and stator-z to refer to directions and/or coordinates in the stator coordinate system, and the terms mover-x, mover-y and mover-z to refer to directions and/or coordinates in the mover coordinate system. In this description and the associated drawings, the symbols Xm, Ym, and Zm may be used to refer respectively to the mover-x, mover-y, and mover-z directions, the symbols Xs, Ys, and Zs may be used to refer respectively to the stator-x, stator-y, and stator-z directions, and the symbols X, Y, and Z may be used to refer respectively to either or both of the mover-x, mover-y, and mover-z and/or stator-x, stator-y, and stator-z directions. In some embodiments, during normal operation, the mover-z and stator-z directions are approximately in the same direction (e.g. within ±30° in some embodiments; within ±10° in some embodiments; and within ±2° in some embodiments). Although in this description the work surface is essentially flat and planar, it will be understood to those skilled in the art that this is not essential and that the work surface of the stator (e.g. the surface facing movers) can be a curved surface including but not being limited to a cylindrical surface or a spherical surface, with suitable modification of control algorithms and stator coil layout disclosed herein.

In some embodiments, the stator-x and stator-y directions are non-parallel. In particular embodiments, the stator-x and stator-y directions are generally orthogonal. In some embodiments, the mover-x and mover-y directions are non-parallel. In particular embodiments, the mover-x and mover-y directions are generally orthogonal. In some embodiments, the stator-x and stator-y directions are parallel with the stator work surface, and the stator-z direction is normal to the stator work surface.

FIG. 1A shows a robotic system 900 according to a particular embodiment. FIG. 1A shows a side view of the system 900. The robotic system 900 comprises a stator 200 and a mover 100, one or more controllers 70, and one or more sensors 80 (not shown) for providing position feedback signals. The stator 200 comprises a stator actuation coil assembly 50 and a stator coupling coil assembly 60. The mover 100 comprises at least a first magnetically responsive unit ($1^{st}$ MRU) 10 and a second magnetically responsive unit ($2^{nd}$ MRU) 20. The stator actuation coil assembly 50 comprises a plurality of actuation coil circuits 51. Actuation coil circuits 51 may be driven with suitable currents by stator driving circuits, which generate magnetic fields interacting with the $1^{st}$ MRU to move the mover 100 in at least two in-plane degrees of freedom (such as but not being limited to linear motion in the X and Y directions). The stator coupling coil assembly 60 comprise one or more coupling coil circuits 61 which can create magnetic field coupling with the $2^{nd}$ MRU 20 for the purpose of transfer of energy or information. In some embodiments, coupling coil circuits 61 and $2^{nd}$ MRU 20 overlap with each other in the Z direction. However, this is not essential. In some embodiments, the $2^{nd}$ MRU 20 overlaps with an effective stator coupling coil region 63, which generally extends beyond the footprint of stator coupling coil assembly 60 by 10-50% of the linear dimension of stator coupling coil assembly 60 in X and Y directions, respectively, as shown in FIG. 4C. In some embodiments, the effective stator coupling coil region 63 has a footprint that is smaller than the coupling coil assembly 60's footprint. In some embodiments, a single coupling coil assembly 60 may have more than one effective stator coupling coil region 63, as shown in FIG. 4D. In one example, when the $2^{nd}$ MRU 20 overlaps with the effective stator coupling coil region 63 in the Z direction, the coupling between $2^{nd}$ MRU 20 and coupling coil circuits 61 is very strong and may alter the coupling coil mutual inductance significantly in comparison with that in a weak coupling (e.g. when the $2^{nd}$ MRU 20 has little or no overlap with the effective stator coupling coil region 63 in the Z direction). In one example, bidirectional transfer of power/information between stator coupling coil assembly 60 and $2^{nd}$ MRU 20 includes bidirectional information transfer. In another example, bidirectional transfer of power/information between stator coupling coil assembly 60 and $2^{nd}$ MRU 20 includes power transfer in one direction (such as from stator coupling coil assembly 60 to $2^{nd}$ MRU 20) and information transfer in another direction (such as from $2^{nd}$ MRU 20 to stator coupling coil assembly 60).

The coupling coil circuits 61 are driven with currents at a base frequency significantly higher than the base frequencies of currents flowing into the actuation coil circuits 51. In one non-limiting example, the base frequency of currents in actuation coil circuits 51 are in the range of a few hundred hertz or less, while the base frequency of currents in coupling circuits 61 are in the range of tens of kHz or higher. The coupling coil circuits 61 are driven with currents of amplitudes significantly lower than the amplitude of currents driven into the actuation coil circuits 51. In one non-limiting example, the amplitude of currents in the actuation coil circuits 51 is in the range of amperes or higher, while the amplitude of currents in the coupling coil circuits 61 is in the range of milliamperes or lower. The coupling coil circuits 61 have a geometry (shape and/or coil width) significantly different from the actuation coil circuits 51. For example, the coil circuits 51 may be linearly elongated in the X or Y directions; the coil circuits 61 may be have a rectangular, square, circular, or any other suitable shape in the plane extending in the X or Y directions.

In one non-limiting example, the $1^{st}$ MRU 10 comprises a magnet array suitably designed so that the interaction between the actuation coil currents and the $1^{st}$ MRU 10 via magnetic fields can controllably move the mover 100 in at least two degrees of freedom.

In one non-limiting example, the $2^{nd}$ MRU 20 comprises an inductive coil and a capacitor, the inductive coil and the capacitor suitably connected to form a resonance circuit to facilitate bidirectional transfer of power or information. In some embodiment, the $2^{nd}$ MRU 20 may transfer its internally stored information to the coupling coil circuit 61, by demodulating the terminal voltage or currents of the coupling coil circuit 61.

In one non-limiting example, the $2^{nd}$ MRU 20 comprises a material of high electrical conductivity, such as but not being limited to copper or gold, so that the coupling between the $2^{nd}$ MRU 20 and the coupling coil circuit 61 significantly weakens the inductance of the coupling coil circuit 61, such as by 20% or more. The inductance change (reduction) can be used to indicate whether the $2^{nd}$ MRU 20 is located above the coupling coil circuit 61 for detecting the mover's in-plane orientation (its angular rotation relative to the Z axis).

In one non-limiting example, the $2^{nd}$ MRU 20 may comprise a magnetic core made of material(s) of high magnetic permeability, such as but not being limited to iron and/or nickel, so that the coupling between the $2^{nd}$ MRU 20 and the coupling coil circuit 61 is strengthened. In this embodiment, the inductive coil of the $2^{nd}$ MRU 20 is wound around the magnetic core.

One non-limiting example of actuation coil circuits 51 and/or coupling coil circuits 61 are traces manufactured with PCB fabrication technology.

In some embodiments, the actuation coil circuits 51 and the coupling coil circuits 61 overlap with each other in the stator Z direction, but are located at different Z positions, so that the coupling coil circuits 61 do not interrupt the continuity of actuation coil circuits 51, and the mover 100 can be actuated smoothly during its planar motion in at least two planar degrees of freedom.

The actuation coil circuits 51 and the coupling coil circuits 61 are intentionally designed or created in such a way to minimize the cross-coupling between the coupling coil circuits 61 and the $1^{st}$ MRU 10, and/or the cross-coupling between the actuation coil circuits 51 and the $2^{nd}$ MRU 20.

The mover 100 is controllably moveable along a work surface 3, which is the top surface of stator 200 extending in the X and Y directions. Due to the fact that the actuation coil circuits 51 and the coupling coil circuits 61 are separated from the mover 100 by the work surface 3, the mover 100's planar motion in the X and Y directions is not mechanically constrained by the actuation coil circuits 51 or the coupling coil circuits 61.

The stator 200 comprises a controller 70. The controller 70 may receive signals from position sensors 80 (not shown in FIG. 1A) to generate suitable currents flowing into the actuation coil circuits 51 to controllably move the mover 100 in the X and Y directions. The controller 70 may also generate suitable currents flowing through the coupling coil circuits 61 or apply a suitable voltage on the coupling coil circuits 61 to interact with the $2^{nd}$ MRU 20 for the purpose of wireless transfer of power or information or for the purpose of detecting the absence/presence of $2^{nd}$ MRU 20. The controller 70 may also detect or measure the terminal voltage and/or currents in the coupling coil circuits 61 for information receiving. Controller 70 and sensors 80 may be configured or connected for controllably moving movers 100 relative to a stator 200 along a work surface 3 either in contact mode or in non-contact mode by separating the mover 100 from the work surface 3 with a Z oriented gap. For example, controller 70 may be configured to receive signals from sensors 80 and generate currents flowing through the coil traces inside the stator actuation coil assembly 50 according to suitable algorithms. Generally, controller 70 comprises power electronics (power amplifiers) to generate the suitable currents.

The mover 100 may be controllably moved relative to the stator 200 by the interaction between the stator actuation coil assembly 50 and the $1^{st}$ MRU 10 about a working region in at least two in-plane DOFs. In some embodiments, mover 100 is capable of 6-DOF controllable motion (X, Y, Z, Rx, Ry, and Rz); in some embodiments, mover 100 is capable of three in-plane DOF controllable motion (X, Y, and Rz), in a passive levitation mode or in a sitting mode.

Although only one mover 100 is shown in FIG. 1A, it should be understood to those skilled in the art that a system may comprise one or more movers. Although only one stator 200 is shown in FIG. 1A, this is not essential as it will become apparent that a robotic system may comprise more than one stator.

Figure 1B:
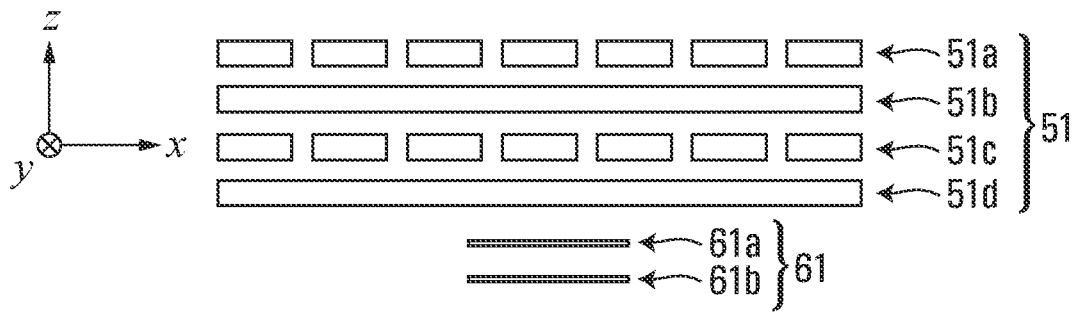
FIGS. 1B-1D show actuation coil circuits according to embodiments of the disclosure.

FIG. 1B shows a side view of a non-limiting example of actuation coil circuits 51 and coupling coil circuits 61. In this embodiment, actuation coil circuits 51 and coupling coil circuits 61 overlap with each other in the stator Z direction.

Figure 1C:
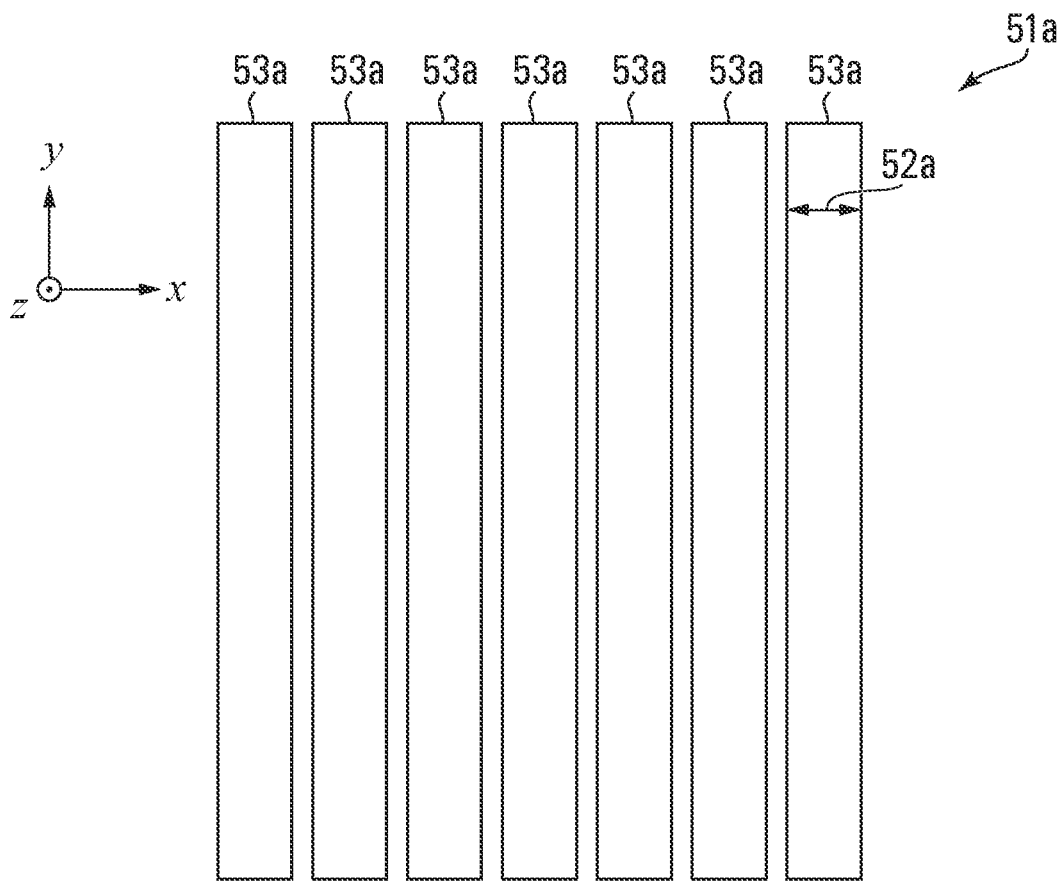
Figure 1D:
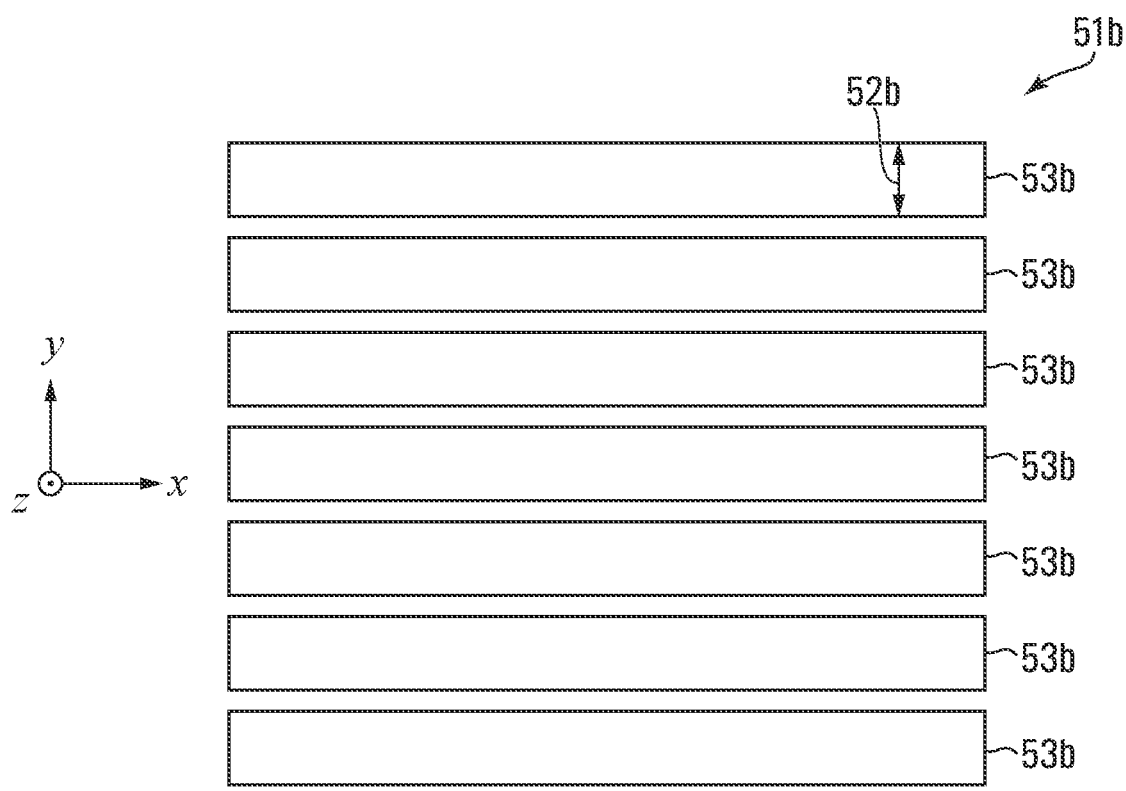
Figure 1E:
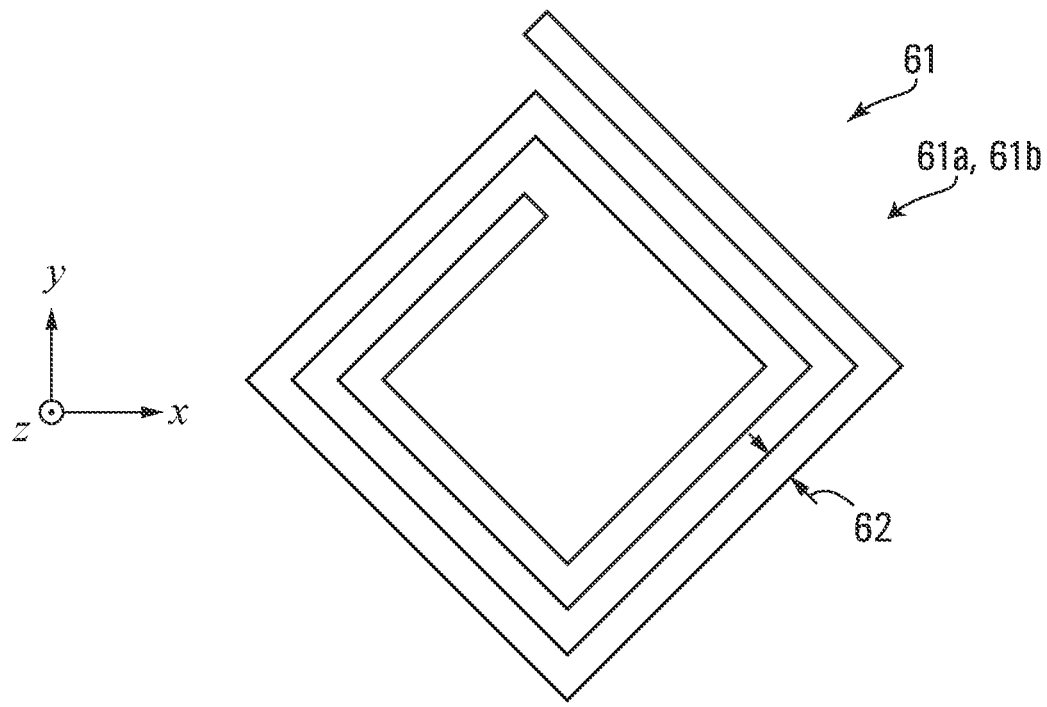
FIG. 1E shows coupling coil circuits according to embodiments of the disclosure.

As shown in FIG. 1B, actuation coil circuits 51 comprise multiple (four in the embodiment of FIG. 1B) layers of coil circuits (51a, 51b, 51c, and 51d). FIG. 1C shows a non-limiting example of the layer 51a comprising a plurality of Y-oriented coils traces 53a, each coil trace 53a having a width 52a. FIG. 1D shows a non-limiting example of layer 51b, comprising a plurality of X-oriented coil trace 53b, each with a width 52b. As a non-limiting example shown in FIG. 1B, coupling coil circuits 61 comprise two layers of coil circuit 61a and 61b. Generally, coupling coil circuits 61 comprise one or more layers. FIG. 1E shows a non-limiting example of trace layers 61a and 61b. The traces in different trace layers 61a and 61b are connected by vias (not shown) in series or in parallel to increase the magnetic coupling to $2^{nd}$ MRU 20. One possible way to make coupling coil circuits 61 is to use printed circuit board fabrication technology. Although two layers of coil traces 61a and 61b are shown in FIG. 1B, this is not essential. Generally, coupling coil circuits 61 may comprise one or more layers of coil traces, and each layer may comprise one or more turns of coil traces (circuits).

It should be noted that the actuation coil circuits 51 and the coupling coil circuits 61 are substantially different from each other in geometry. In some embodiment, the width 62 of coil traces in the coupling coil circuits 61 is substantially smaller than the width 52 of coil traces in the actuation coil circuits 51. In some embodiments, the shape of coil traces in the coupling coil circuits 61 is substantially different from the shape of coil traces in the actuation coil circuits 51. For example, the traces (circuits) in the coupling coil circuits 61 may be in square, circular, triangular, rectangular, or polygonal shapes; traces in the actuation coil circuits 51 may be linearly elongated. A reason for the different geometry is that these two groups of coil traces in the actuation coil circuits 51 and the coupling coil circuits 61 are used to carry currents of significantly different frequencies and significantly different amplitudes.

Figure 2:
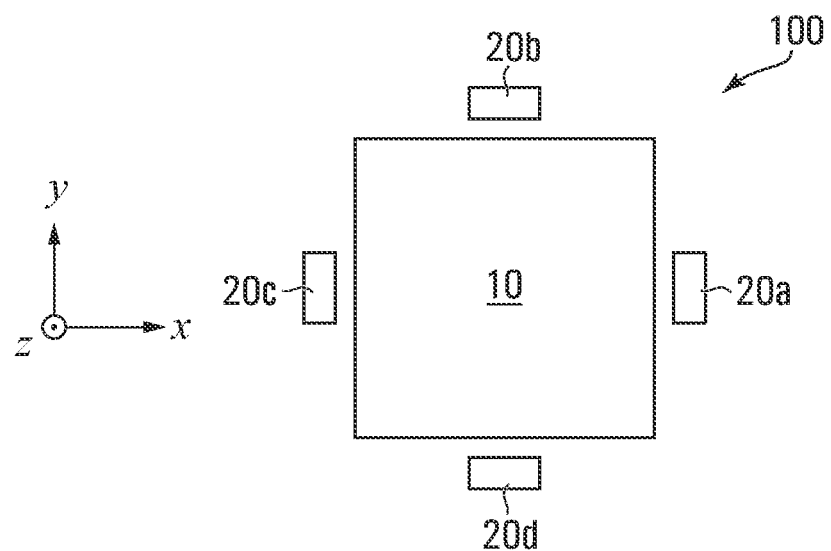
FIG. 2 shows a mover according to embodiments of the disclosure.

FIG. 2 shows a schematic top view of mover 100 according to one embodiment of the disclosure. Mover 100 comprises a $1^{st}$ MRU 10 and four $2^{nd}$ MRU 20A, 20B, 20C, 20D. Although four $2^{nd}$ MRU 20 are shown in FIG. 2, this is not essential. In some embodiments, a mover 100 may comprise one $2^{nd}$ MRU 20; in some embodiments, a mover 100 may comprise two $2^{nd}$ MRU 20. Generally, a mover 100 may comprise one or more $2^{nd}$ MRU 20. Although $2^{nd}$ MRUs 20 are located at the periphery of $1^{st}$ MRU 10 as shown in FIGS. 1A and 2, this is not essential. In some embodiments, there may exist a magnet-free space in the center of $1^{st}$ MRU 10's footprint relative to the stator work surface 3, in which there is no magnet; the $2^{nd}$ MRU 20 may be located in such a magnet-free space, as discussed later.

Figure 3:
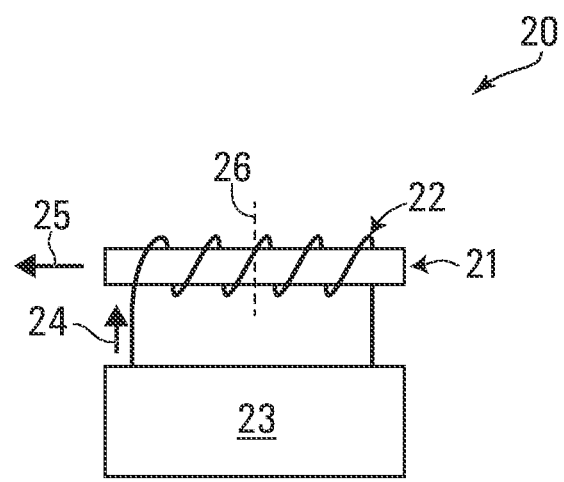
FIG. 3 shows a $2^{nd}$ magnetically responsive unit according to embodiments of the disclosure.

FIG. 3 shows a non-limiting example of a $2^{nd}$ MRU 20 which comprises an inductive coil 22, a magnetic field enhancement core (or a magnetic core) 21 that is made of materials with high magnetic permeability, and a processing unit 23. The processing unit 23 may comprise one or more capacitors so that the one or more capacitors and the inductive coil 22 form a resonant circuit with a resonance frequency tuned to be consistent with the frequency of excitation currents in coupling coil circuits 61 to facilitate power or information transmission with high efficiency from the stator 200 to the mover 100. In some embodiments, the processing unit 23 may additionally comprise one or more modulating circuits and one or more information storage components. The modulation circuit allows the transfer of the information stored in the information storage component from the mover 100 to the stator 200. During the information and/or power transfer process between $2^{nd}$ MRU 20 and coupling coil assembly 60, the magnetic core 21 is used to guide and enhance the magnetic flux encircled by the inductive coil 22. The magnetic core axial direction 25 is the direction of the magnetic core orientation and also the direction around which the inductive coil 22 is wound based on the right-hand rule. The magnetic flux is guided along the axial direction inside the magnetic core 21. Although the magnetic core axial direction 25 is an arrow pointing to the left, it should be understood to those of skill in the art that the actual AC flux may be in direction 25 or opposite to direction 25. Therefore, the magnetic core axial direction 25 is referred as the $2^{nd}$ MRU flux generation axial direction. It should be noted that the magnetic flux generated from the stator coupling coil assembly 60 can achieve the best coupling to the inductive coil 22 when the flux generated by the coupling coil assembly 60 is aligned with the $2^{nd}$ MRU flux generation axial direction. Therefore, the axial direction 25 is a preferred direction for $2^{nd}$ MRU flux generation and for detecting flux by the coupling coil circuits 61. Generally, it is preferred that the flux generated by $1^{st}$ MRU 10 does not saturate the magnetic core 21 of the $2^{nd}$ MRU 20 in the axial direction; otherwise, the coupling effect (and thus power transfer and information transfer) between the $2^{nd}$ MRU 20 and the stator coupling coil assembly 60 will be impaired because, if the magnet core 21 is saturated or close to being saturated in its axial direction, the effective permeability of the magnetic core is significantly reduced.

Figure 4A:
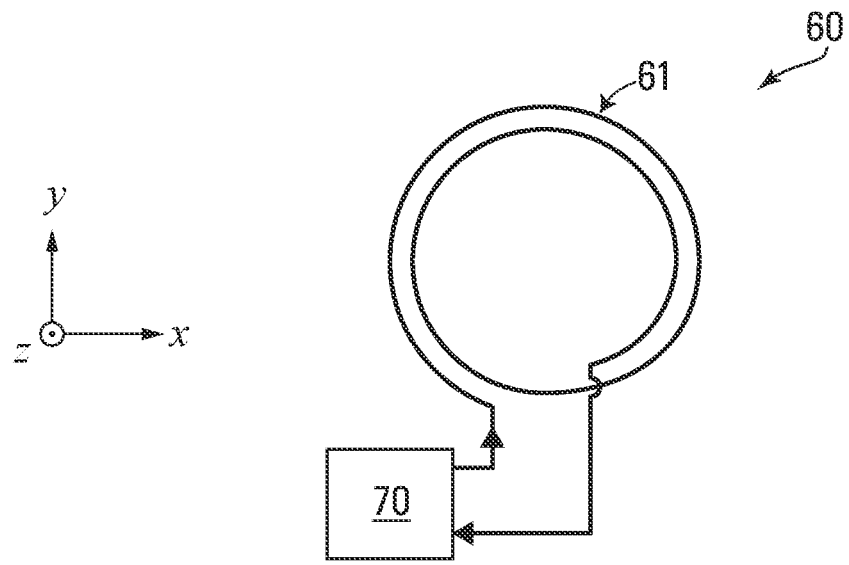
FIGS. 4A and 4B show coupling coil circuits according to embodiments of the disclosure.
Figure 4B:
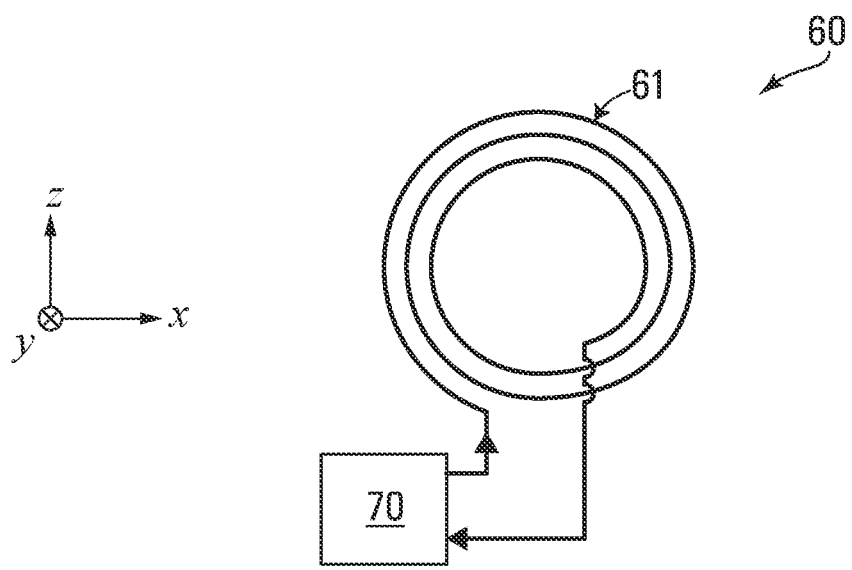
Figure 4C:
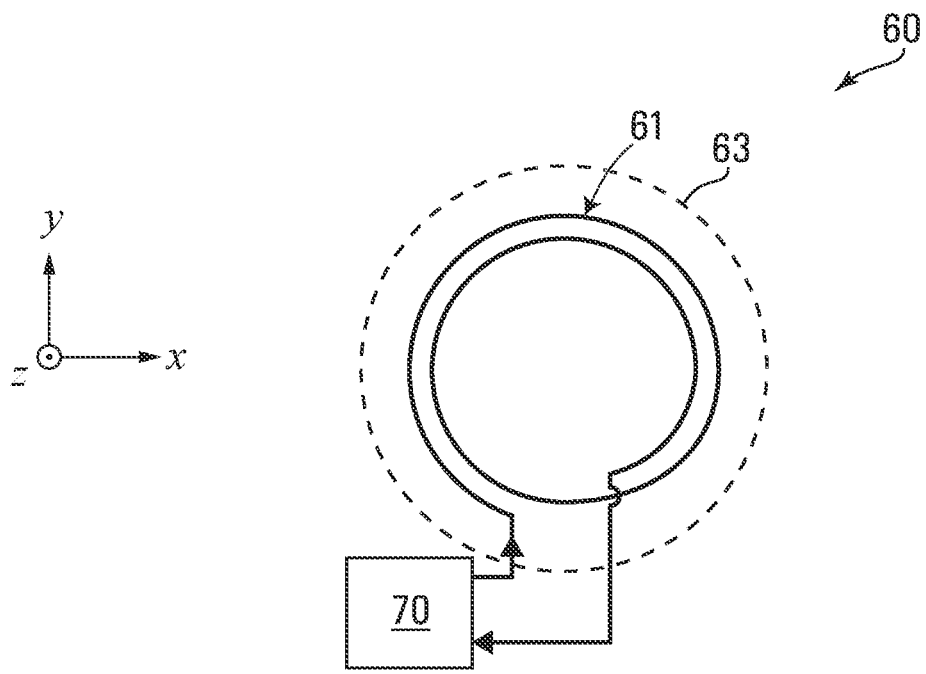
FIG. 4C shows an effective stator coupling coil region, according to embodiments of the disclosure.
Figure 4D:
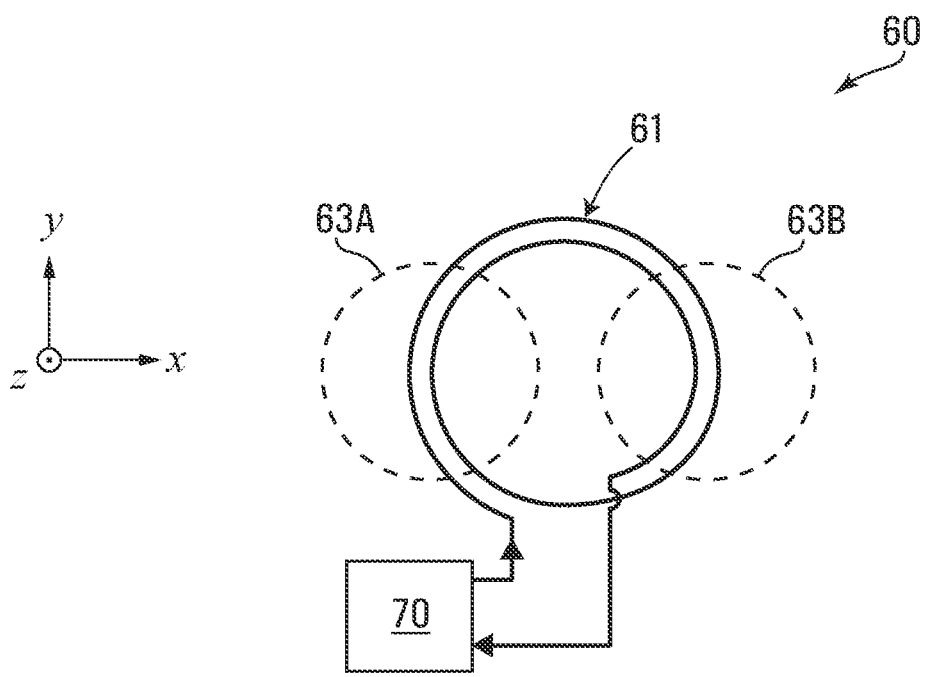
FIG. 4D shows multiple effective stator coupling coil regions, according to embodiments of the disclosure.

FIG. 4A shows one non-limiting example of coupling coil circuits 61: the coil circuits contain multiple turns placed in a plane with its normal direction in the Z direction. FIG. 4B shows another non-limiting example of the coupling coil circuits 61: the coil circuits contain multiple turns located in a plane with its normal direction in the Y direction. FIG. 4C shows the effective stator coupling coil region 63 relative to the coupling coil circuits 61.

Figure 5:
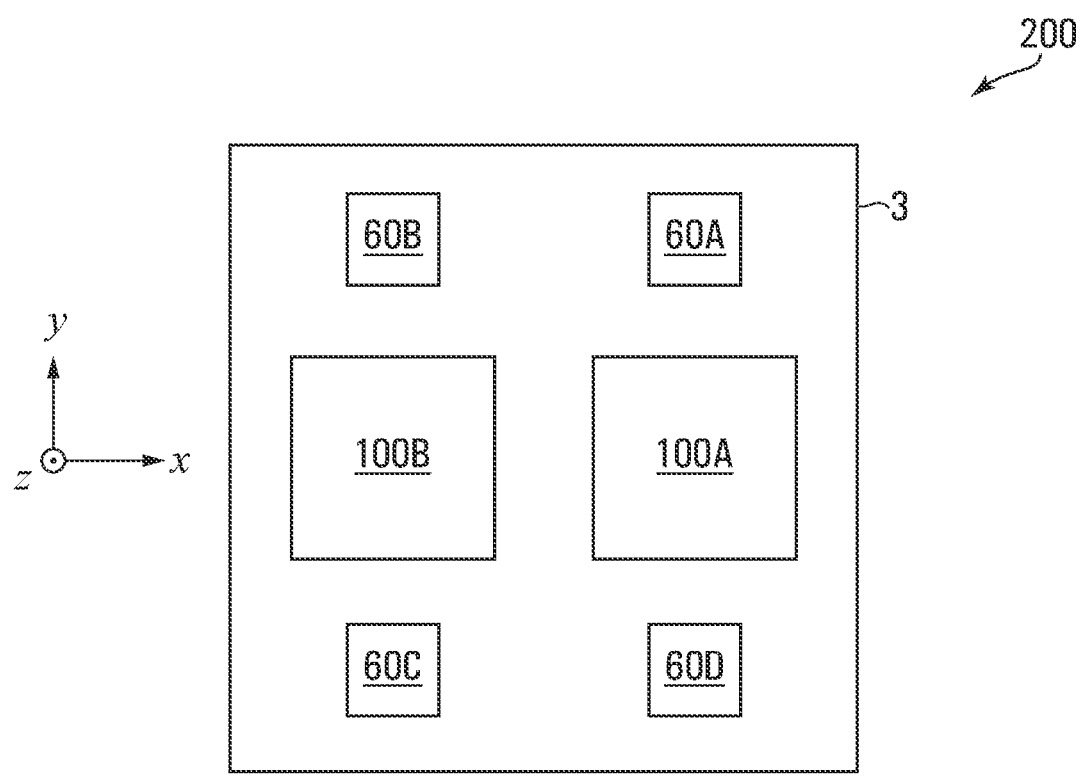
FIG. 5 shows movers and a stator, according to embodiments of the disclosure.

FIG. 5 shows another embodiment according to the disclosure. In this embodiment, the stator 200 comprises multiple coupling coil assemblies 60 and two movers: 100A and 100B. Using controller 70, movers 100A and 100B can be driven to two separate locations, such that the $2^{nd}$ MRU of mover 100A will interact with the stator coupling coil assembly 60A, and the $2^{nd}$ MRU of mover 100B will interact with the stator coupling coil assembly 60B. Thus, it is possible to simultaneous receive data from the $2^{nd}$ MRU of movers 100A and 100B.

In some embodiments, the coupling between the coupling coil circuits 61 and the $2^{nd}$ MRU 20 is used to detect the presence or absence of $2^{nd}$ MRU 20 above coupling coil assembly 60. The inductance of coupling coil assembly 60 will differ greatly between the case of $2^{nd}$ MRU 20 being located above coupling coil assembly 60 as opposed to the case of $2^{nd}$ MRU 20 not being located above coupling coil assembly 60. Such characteristics may be used to detect the presence of mover 100 and/or the orientation of mover 100, as explained later in connection with FIG. 7.

In some embodiments, the stator coupling coil assembly 60 can transfer power/energy to $2^{nd}$ MRU 20 when effective stator coupling coil region 63 and $2^{nd}$ MRU 20 20 are overlapping with each other in the stator Z direction. With the received energy from stator coupling coil assembly 60, $2^{nd}$ MRU 20 can transmit its stored information to coupling coil assembly 60 by exciting its inductive coil 22 with information-carrying AC current 24 to produce a magnetic flux that is coupled to the coupling coil circuits 61, and the coupled flux will induce electrical voltage on the coupling coil circuits 61. In some embodiments, each $2^{nd}$ MRU 20 may store unique identification information so that coupling coil assembly 60 may detect whether a $2^{nd}$ MRU 20 is within its effective stator coupling coil region 63 (in other words, $2^{nd}$ MRU 20 and effective stator coupling coil region 63 are overlapping in the Z direction), but also can detect exactly which $2^{nd}$ MRU 20 is within its effective stator coupling coil region 63.

In some embodiments, each mover 100 may only be able to be rotated around Rz for a relatively small angle range such as +/−15 degrees or less. However, there may exist multiple possible Rz orientation ranges, including but not limited to 0+/−15 degrees, 90+/−15 degrees, 180+/−15 degrees, and 270+/−15 degrees. In order to determine the absolute Rz orientation (e.g. distinguish which Rz orientation range the mover 100 is actually in), one method is described in connection with FIGS. 6A-6D. FIGS. 6A-6D show one embodiment according to the disclosure. One mover 100 comprises four second magnetically responsive units 20A, 20B, 20C, and 20D. Each of the four $2^{nd}$ MRUs 20 stores unique identification information related to mover 100. When the mover center 101 is positioned at a determining location (x0, y0), one of the $2^{nd}$ MRUs 20 will overlap with the effective stator coupling coil region 63 in the Z direction. By detecting the specific $2^{nd}$ MRU 20 above effective stator coupling coil region 63, the system controller 70 can determine which one of the four possible orientations (FIGS. 6A through 6D) the mover 100 is positioned in.

Figure 6A:
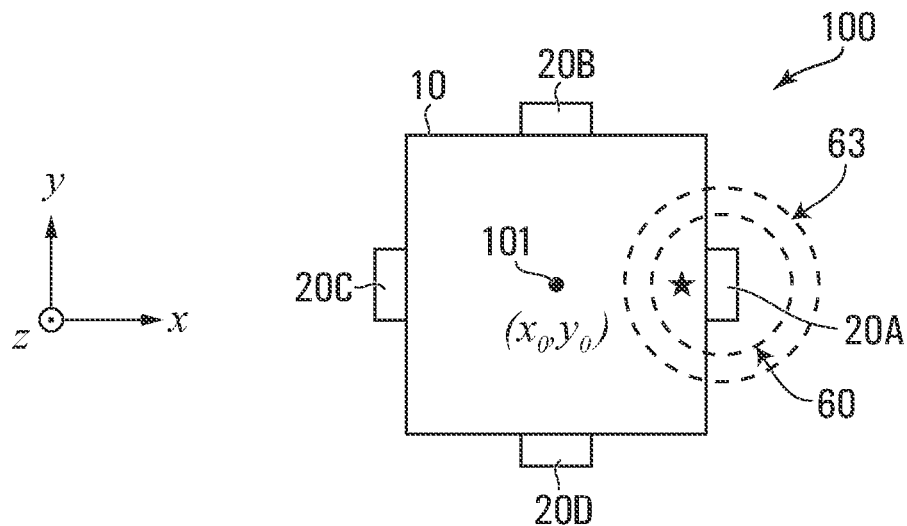
FIG. 6A-6D show different orientations of a mover, according to embodiments of the disclosure.
Figure 6B:
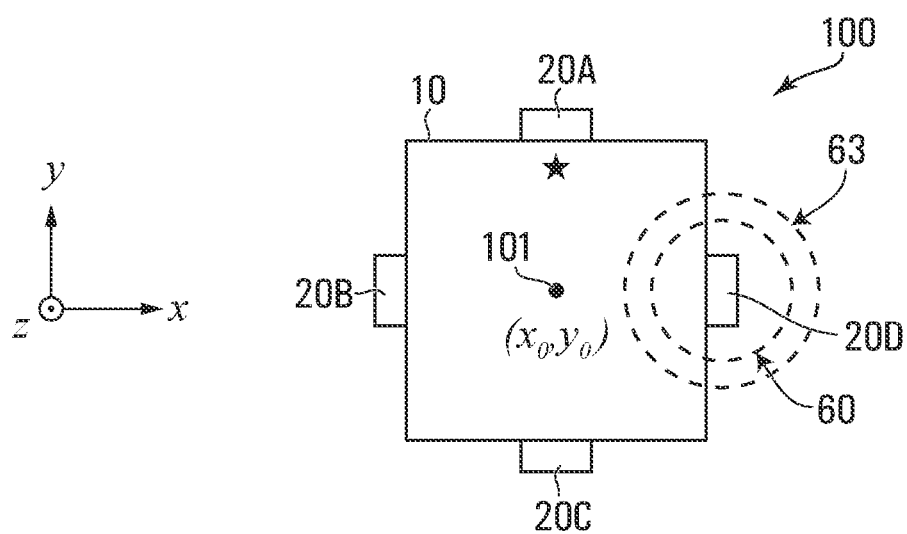
Figure 6C:
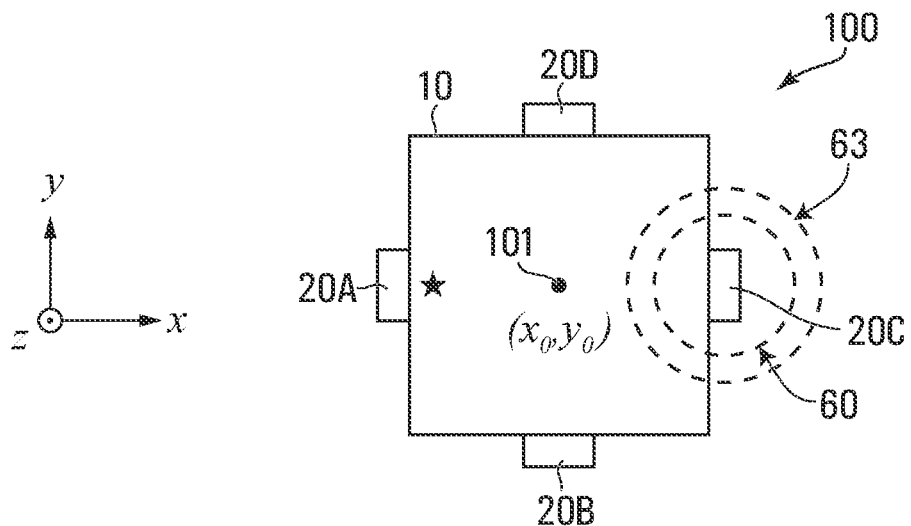
Figure 6D:
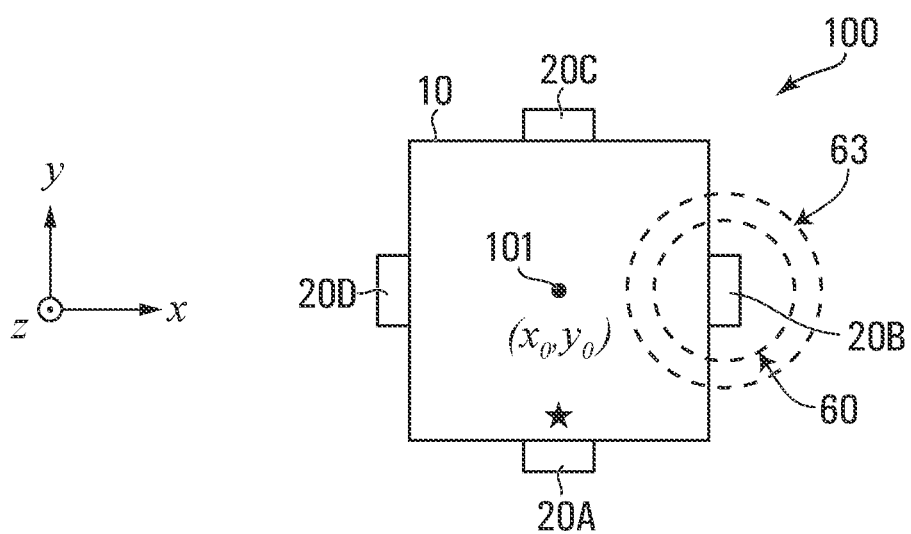

In FIGS. 6A-6D, a star is used to represent the mover Rz absolute orientation. In FIG. 6A, when the mover center 101 is moved to (x0, y0), $2^{nd}$ MRU 20A will overlap with effective stator coupling coil region 63 and the unique information stored in $2^{nd}$ MRU 20A can be transferred to coupling coil assembly 60, and accordingly the controller 70 can detect the mover Rz absolute orientation. FIG. 6B shows another possible orientation of mover 100 with the star in the positive Y direction relative to the mover center 101. When the mover center 101 is moved to (x0, y0), $2^{nd}$ MRU 20D will overlap with effective stator coupling coil region 63 and the unique information stored in $2^{nd}$ MRU 20D can be transferred to coupling coil assembly 60, and accordingly the controller 70 can detect the mover Rz orientation. Two other possible orientations (FIGS. 6C and 6D) can also be detected with similar methods by reading the unique information from the $2^{nd}$ MRU 20 overlapping with effective stator coupling coil region 63. It should be noted that the four $2^{nd}$ MRU 20 should be positioned such that, when the mover center 101 is positioned in the determining position (x0, y0) (which may otherwise be known as a sensing position), there is always at least one $2^{nd}$ MRU 20 overlapping with the coupling coil assembly 60 in the Z direction. Although in the above description the term mover center 101 has been used, generally, any suitable reference point 101 on the mover 100 may be used.

Generally, the detection procedure can be summarized in the following steps:
  (1) Position the mover center 101 (or reference point 101 on the mover 100) to a specific stator location (x0, y0) so that one of the plurality of $2^{nd}$ MRUs 20 is overlapping with the effective stator coupling coil region 63.
  (2) Read the unique information stored in the overlapping $2^{nd}$ MRU 20.
  (3) Determine the orientation of the mover 100.

Figure 7A:
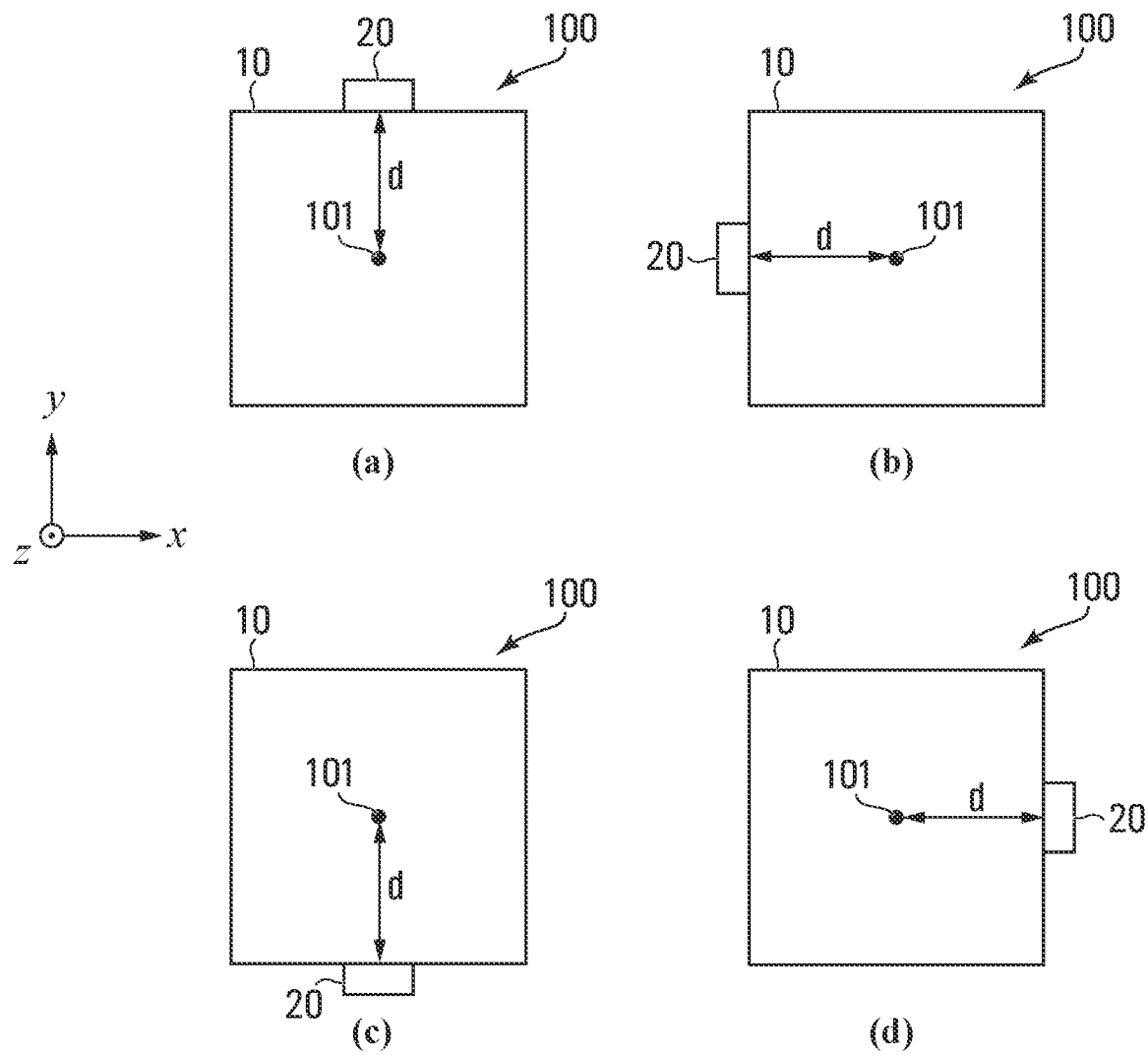
FIG. 7A shows different orientations of a mover, according to embodiments of the disclosure.
Figure 7B:
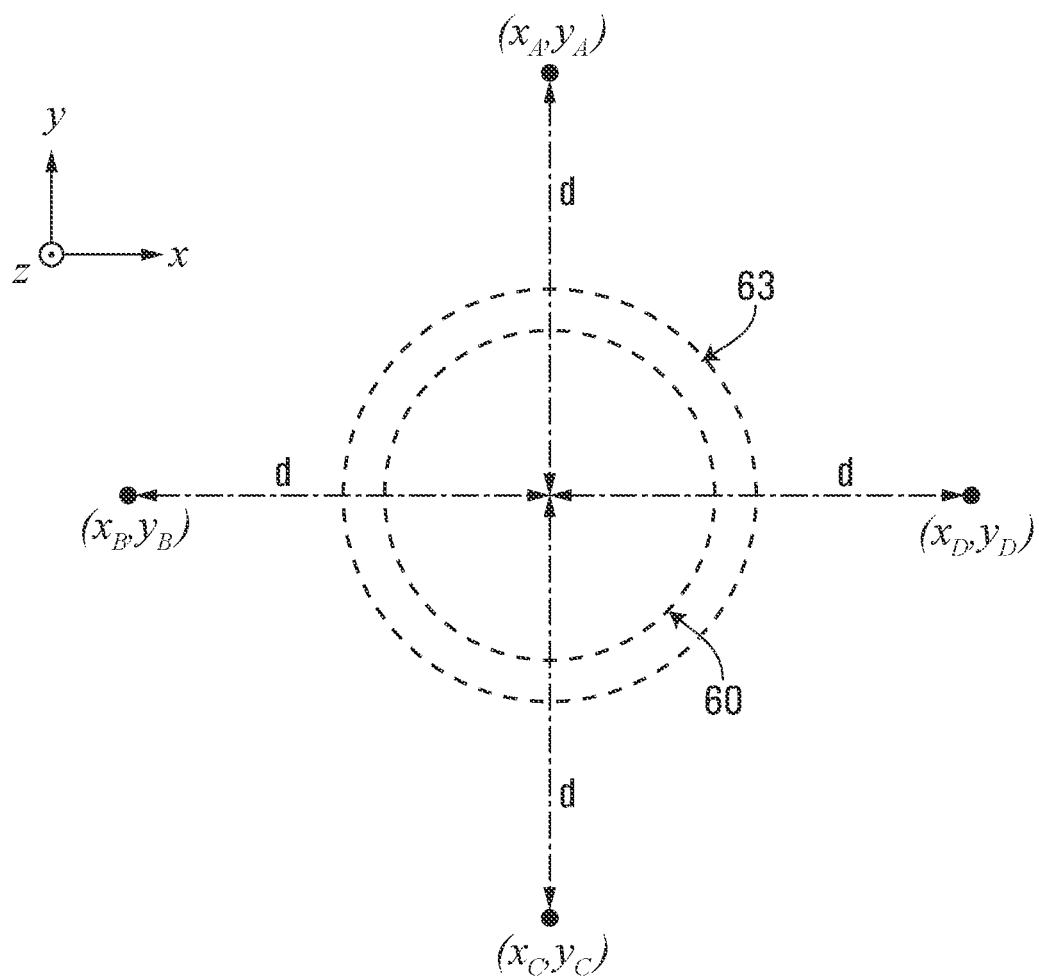
FIG. 7B shows different sensing positions according to embodiments of the disclosure.

FIGS. 7A and 7B show another embodiment according to the disclosure. As shown in FIG. 7A, a mover 100 comprises one $2^{nd}$ MRU 20. However, when the mover 100 is placed onto the stator 200, it may be in one of the four possible Rz orientations: (a), (b), (c), and (d) in FIG. 7A, with small Rz angle ranges such as +/−10 or +/−15 degrees. In order to determine the absolute Rz orientation in which the mover 100 is in, the mover 100 can be driven such that its reference point 101 (such as but not being limited to its center) is moved sequentially to each of the four determining locations $(X_A, Y_A)$, $(X_B, Y_B)$, $(X_C, Y_C)$, $(X_D, Y_D)$ shown in FIG. 7B. The distance d between $2^{nd}$ MRU 20 and the reference point 101 is equal to the distance d between effective stator coupling coil region 63 center and any of the four determining locations. As a result, the $2^{nd}$ MRU 20 will overlap with effective stator coupling coil region 63 in the Z direction when the reference point 101 is located in one of the four determining locations. Accordingly, the Rz orientation of the mover 100 can be derived. For example, if the mover Rz orientation is the case of (b) shown in FIG. 7A, then, when the reference point 101 is at $(X_D, Y_D)$, the coupling coil assembly 60 will detect the presence of $2^{nd}$ MRU 20, but not when the reference point 101 is at any of the other three determining positions. As mentioned above, although the mover center 101 is used as a reference point for defining the mover position in the XY plane, this is not essential. The reference point could be any other point on the mover 100. Furthermore, it is not essential for the mover 100 to be driven to all four determining locations before $2^{nd}$ MRU 20 is identified; the $2^{nd}$ MRU 20 may be detected before the mover 100 has been driven to all four determining locations.

Figure 8:
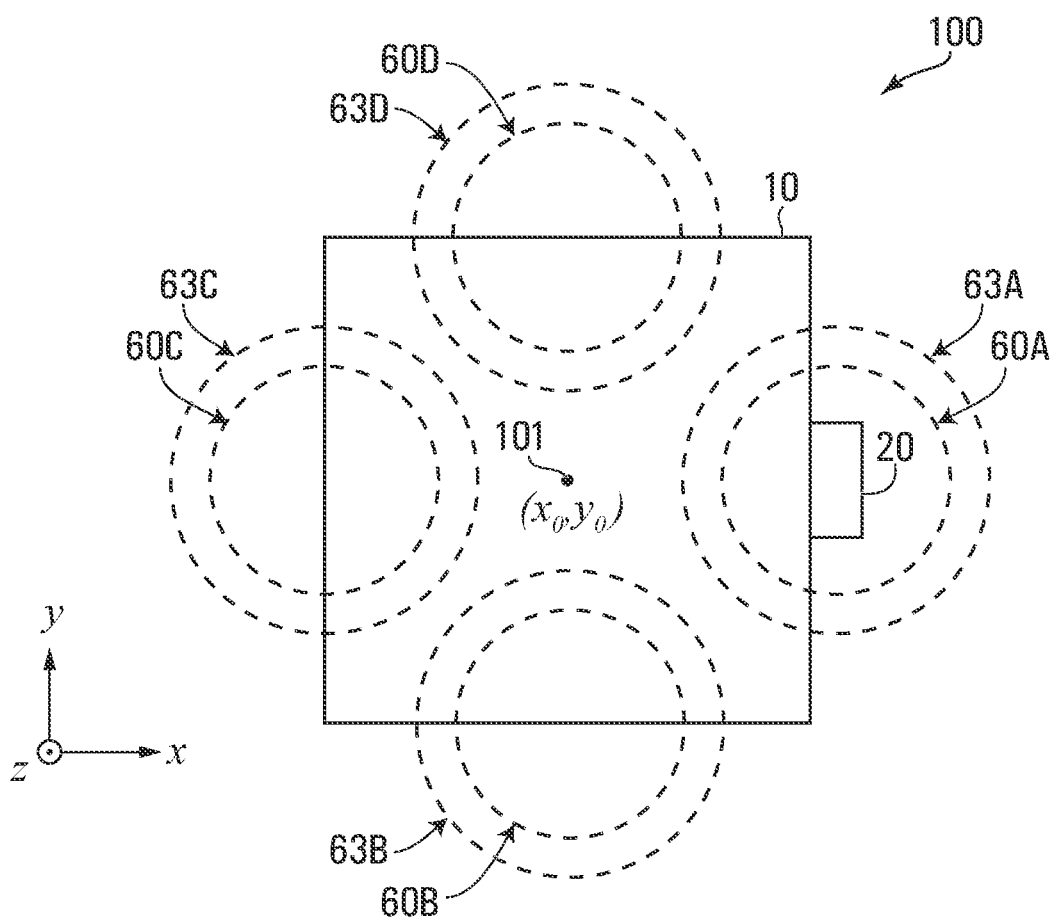
FIG. 8 shows a mover and a stator with multiple stator coupling coil assemblies, according to embodiments of the disclosure.

FIG. 8 shows another embodiment according to the disclosure. The mover 100 comprise one $2^{nd}$ MRU 20; the stator 200 comprises four stator coupling coil assemblies 60A, 60B, 60C, 60D, each with a respective effective stator coupling coil region 63A, 63B, 63C, 63D. When the reference point 101 is positioned at a determining location (x0,y0), the $2^{nd}$ MRU 20 overlaps with one of the four effective stator coupling coil regions 63A, 63B, 63C, 63D. As a result, regardless of which Rz orientation range of FIG. 7A the mover 100 is in, its absolute Rz orientation can be detected. For example, when the mover 100 as shown in FIG. 8, effective static coupling coil region 63A overlaps with $2^{nd}$ MRU 20 in the Z direction, and thus can detect the presence of $2^{nd}$ MRU 20. However, none of the other three coupling coil assemblies 60B, 60C, 60D can detect the presence of $2^{nd}$ MRU 20. Based on which coupling coil assembly can detect $2^{nd}$ MRU 20, the absolute Rz orientation range of mover 100 can be determined.

Figure 9A:
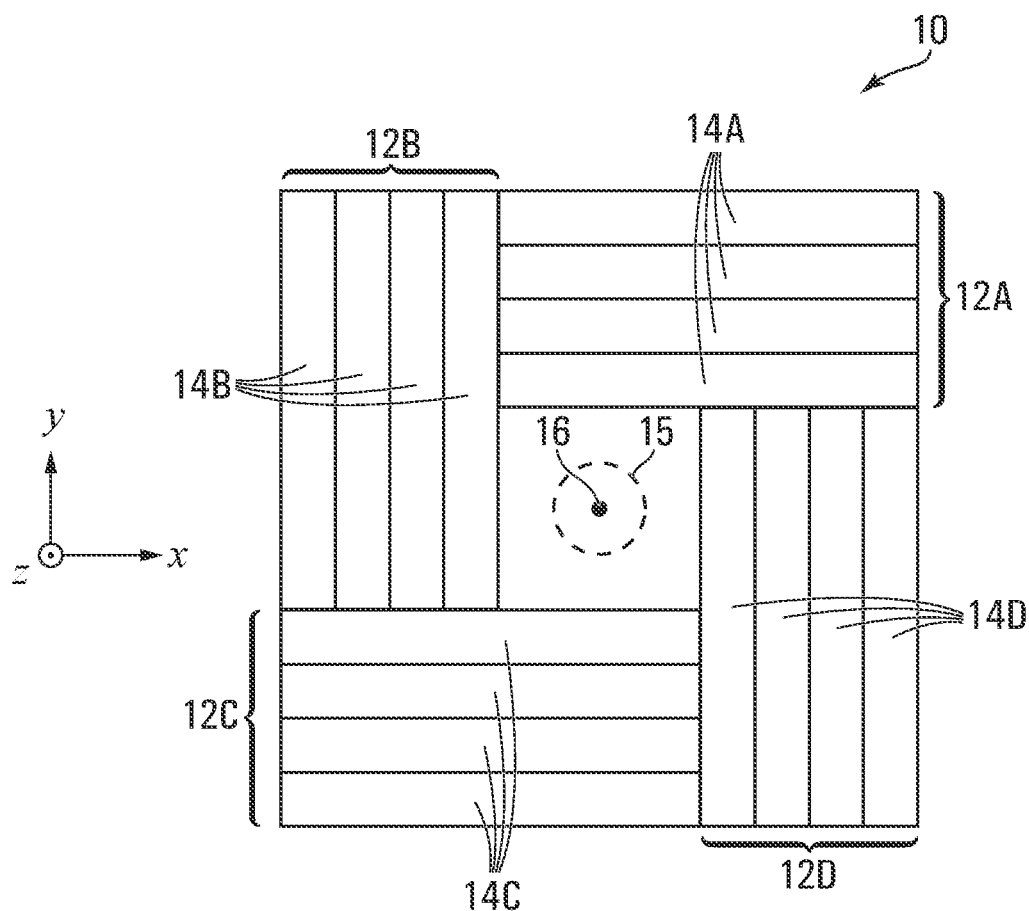
FIG. 9A shows multiple magnet arrays of a mover, according to embodiments of the disclosure.
Figure 9B:
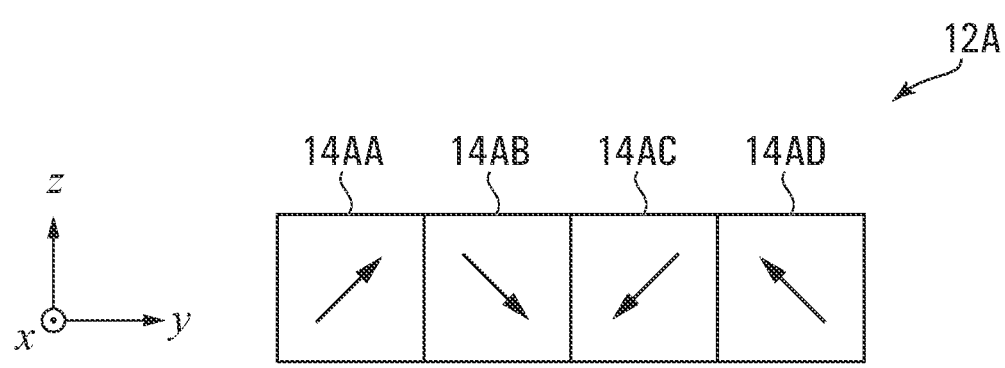
FIG. 9B shows magnetization segments of a magnet array of a mover, according to embodiments of the disclosure.

FIGS. 9A and 9B show another non-limiting embodiment according to the disclosure. The $1^{st}$ MRU comprises a plurality of magnet arrays (four magnet arrays 12A, 12B, 12C, 12D for the example embodiment in FIG. 9A). Each magnet array comprises a plurality of magnetization segments 14 (four magnetization segments 14 in each magnet array in FIG. 9A). For example, magnet array 12A comprises four magnetization segments 14A. As shown in FIG. 9B, each of magnetization segments 14AA, 14AB, 14AC, 14AD is linearly elongated in the X direction and each magnetization segment has a magnetization direction orthogonal to its elongation direction in the X direction. As shown in FIG. 9A, near the center of the $1^{st}$ MRU magnet assembly in the X and Y directions, there is a magnet-free space 15. Due to the 90-degree symmetric configuration of the magnet assembly (i.e. when the magnet assembly is rotated around the Z axis by 90 degrees, there is no difference in terms of magnetic field generation from the $1^{st}$ MRU), in the magnet-free space 15 the magnetic flux from the $1^{st}$ MRU magnet assembly is in the +Z or −Z directions. In some embodiments, a $2^{nd}$ MRU 20 can be located inside the magnet-free space 15 and the $2^{nd}$ MRU flux generation axial direction is preferably positioned orthogonal to the Z direction. As a result, the flux from the permanent magnet of the $1^{st}$ MRU does not saturate the magnetic core 21 of the $2^{nd}$ MRU 20 in the flux generation axial direction, and thus interference between the $1^{st}$ MRU and the bidirectional transfer of information and/or power between $2^{nd}$ MRU and the stator coupling coil assembly 60 is minimized.

In some embodiments, it may be advantageous to position the $2^{nd}$ MRU 20 such that the $2^{nd}$ MRU magnetic core axial dimension center 26 (shown in FIG. 3) does not coincide with the center 16 of the magnet-free space 15 so that the offset in the X and/or Y directions between them can be used to detect the mover 100's absolute Rz orientation (e.g. in which of the four possible Rz orientations the mover 100 is in).

Figure 10A:
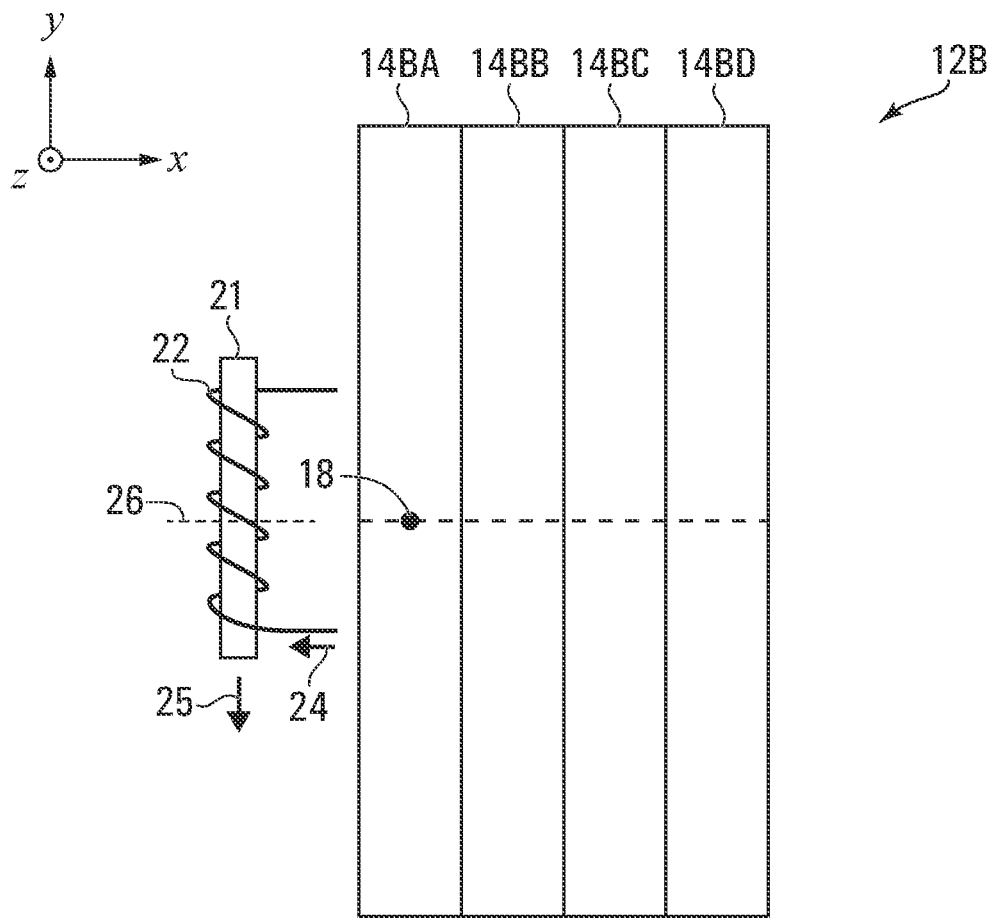
FIG. 10A shows a $2^{nd}$ magnetically responsive unit adjacent a magnet array, according to embodiments of the disclosure.
Figure 10B:
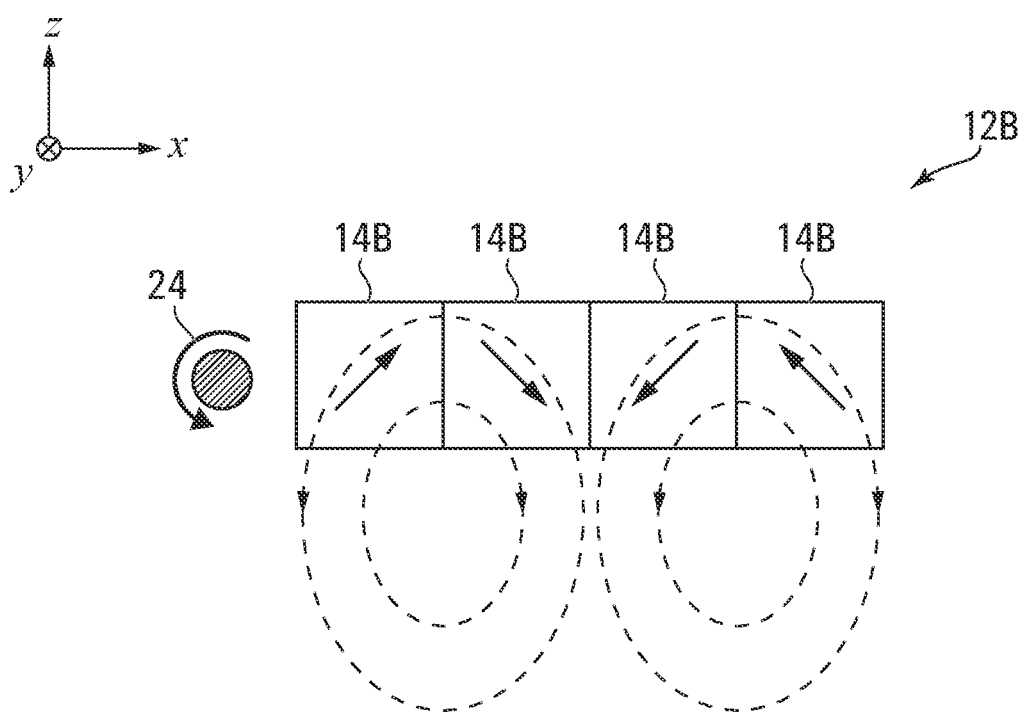
FIG. 10B shows an alternative view of the $2^{nd}$ magnetically responsive unit of FIG. 10A adjacent the magnet array of FIG. 10A.

As shown in FIG. 10A, a $2^{nd}$ MRU 20 is placed beside a magnet array 12B of the $1^{st}$ MRU so as to minimize the effect of the leakage flux from the magnet array 12B on the functionality of the $2^{nd}$ MRU 20. The $2^{nd}$ MRU flux generation axial direction 25 is generally parallel to the elongation direction of its adjacent magnetization segment 14BA. As shown in FIG. 10B, the magnetization direction of each magnetization segment 14B in 12B is orthogonal to its elongation direction (i.e. the Y direction); when the $2^{nd}$ MRU flux generation axial direction 25 is generally parallel to the Y direction, the leakage flux from the magnet array will penetrate into the magnetic core 21 in a direction orthogonal to the $2^{nd}$ MRU flux generation axial direction 25, which minimizes the likelihood that the leakage flux will saturate the magnetic core 21 in the $2^{nd}$ MRU flux generation axial direction 25. As a result, the effect on the flux generation of $2^{nd}$ MRU 20 is minimized. Generally, in some embodiments, the $2^{nd}$ MRU flux generation axial direction 25 is generally parallel to the elongation direction of its adjacent magnetization segment of the $1^{st}$ MRU, where the magnetization segment has a magnetization direction orthogonal to its elongation direction.

Since magnet array 12B has a finite extension in the Y direction, the leakage field from the magnet array 12B has a Y-component that is strongest near the two ends of the magnet array 12B in the Y direction, and weakest near the plane extending in the X and Z directions and passing through the Y dimension center of the magnetization segment 12B. In some embodiments, it is advantageous to position the $1^{st}$ MRU 10 and $2^{nd}$ MRU 20 such that the $2^{nd}$ MRU magnetic core axial dimension center 26 is sufficiently near to or coincides with the plane extending in the X and Z directions and passing through the Y dimension center of the magnetization segment 12B adjacent to the $2^{nd}$ MRU magnetic core, or such that the $2^{nd}$ MRU magnetic core axial dimension center 26 is sufficiently far from the two ends of the magnet array 12B in the Y direction, such that the leakage field from the magnet array has a minimal axial (Y-direction) component. Sufficiently far from the two ends of the magnet array 12B may be interpreted as a Y-distance between the magnetic core axial dimension center 26 and the ends of the magnet array 12B that is larger than about ⅓ of the Y-dimension of the magnet array 12B. In some embodiments, sufficiently far may be interpreted as meaning that a distance separating either end of magnet array 12B from magnetic core axial dimension center 26 is greater than a length of the $2^{nd}$ MRU magnetic core.

Figure 11:
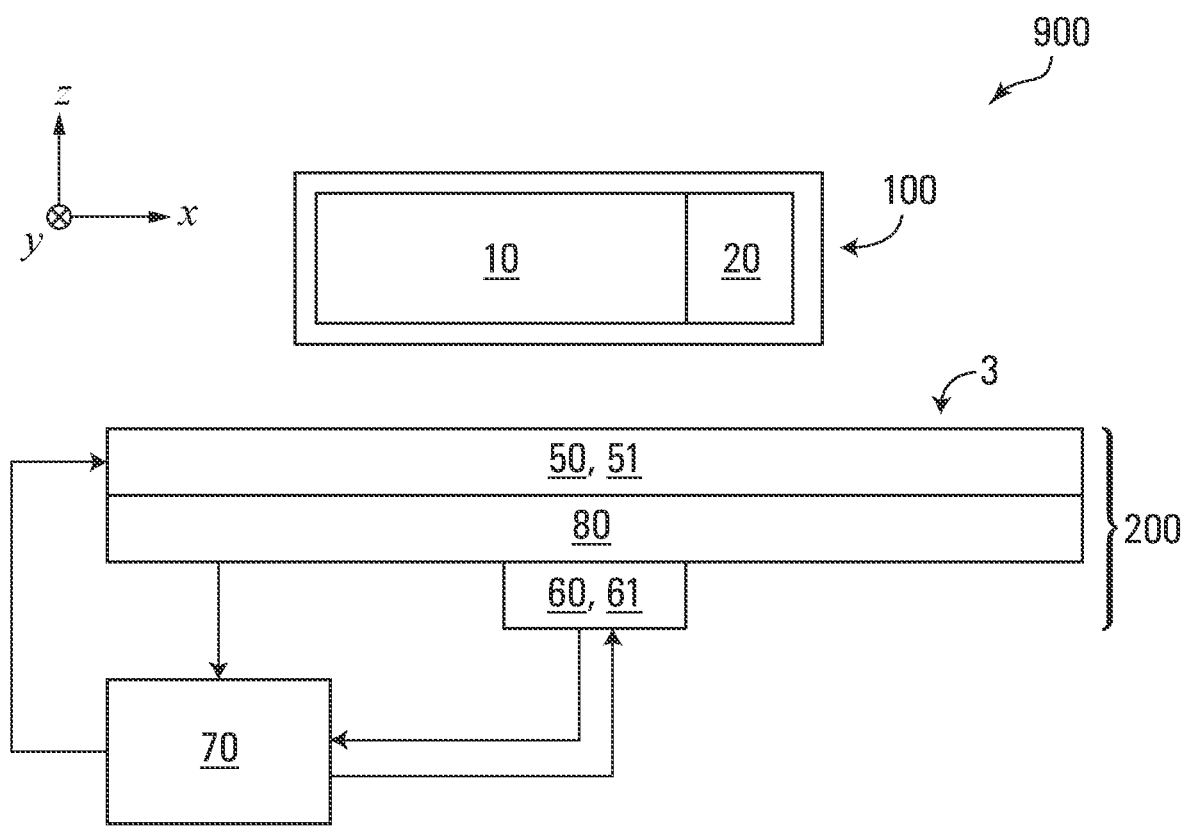
FIGS. 11-13 show systems including a mover, stator, and a controller, according to embodiments of the disclosure.

FIG. 11 shows a particular embodiment according to the disclosure. The stator 200 comprises a sensor 80 that is significantly larger in the XY plane than the stator coupling coil assembly 60. During operation of the robotics system 900, the mover 100 is identified according to any of the herein-described methods, e.g. by moving the mover 100 such that its $2^{nd}$ MRU 20 overlaps with an effective stator coil region 63 in the Z direction, and information from the $2^{nd}$ MRU 20 is transmitted to the controller 70 through the interaction between the $2^{nd}$ MRU 20 and the stator coupling coil assembly 60, and this information is used to identify the mover 100 and optionally determine the mover 100's absolute orientation. After this transmission of information, the controller 70 continuously tracks the position of the $1^{st}$ MRU 10 of mover 100 by using sensor 80, so that the identification of mover 100 is always known, even when mover 100's $2^{nd}$ MRU 20 is not positioned above an effective stator coil region 63. In this embodiment, it is only necessary to perform the identification of mover 100 once, through the interaction between the $2^{nd}$ MRU 20 and the stator coupling coil assembly 60.

Figure 12:
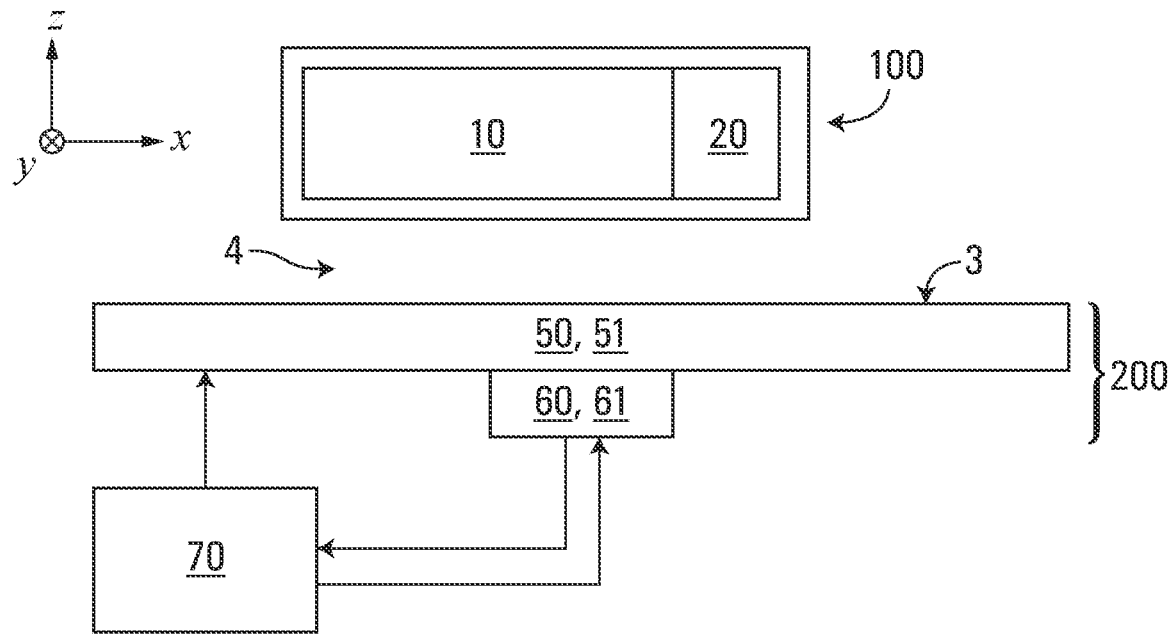

FIG. 12 shows that, in some embodiments, it may be advantageous to control the Z direction separation 4 between the mover 100 and the work surface 3 in order to achieve the strongest coupling between the $2^{nd}$ MRU 20 and the stator coupling coil assembly 60. In a particular embodiment, the Z direction separation 4 is generally minimal (e.g. about 0 mm) such that the mover 100 is considered to be in contact with the work surface 3. In some embodiments, the Z direction separation 4 is greater than 0, such that the mover 100 is levitating above the work surface 3. One reason for having different optimal Z direction separations is due to the different materials that may exist between $2^{nd}$ MRU 20 and stator coupling coil assembly 60 (e.g. such as the material forming work surface 3), and that may affect the coupling between $2^{nd}$ MRU 20 and stator coupling coil assembly 60 in different ways.

Figure 13:
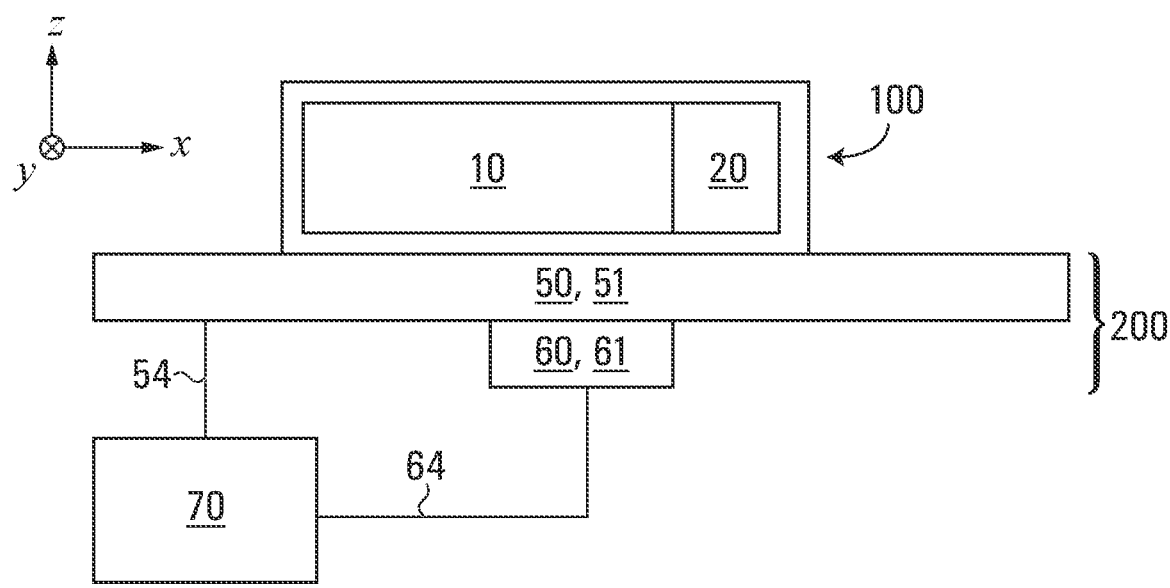
Figure 14A:
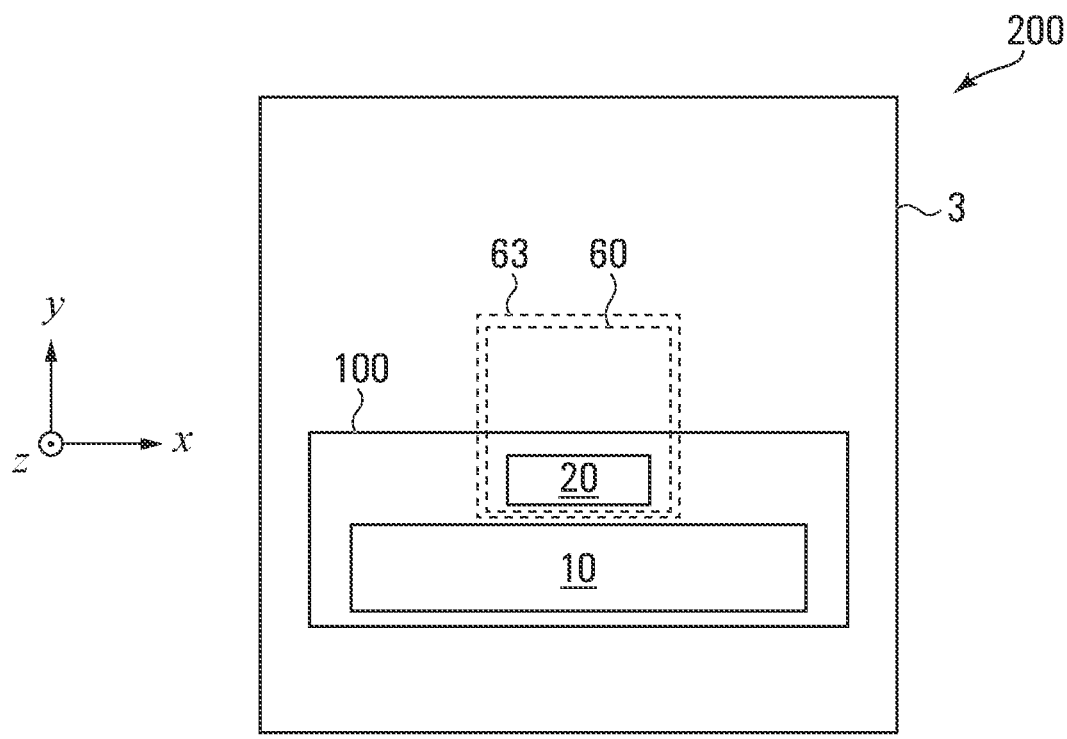
FIGS. 14A-14D show different orientations of a mover relative to an effective stator coupling coil region, according to embodiments of the disclosure.
Figure 14B:
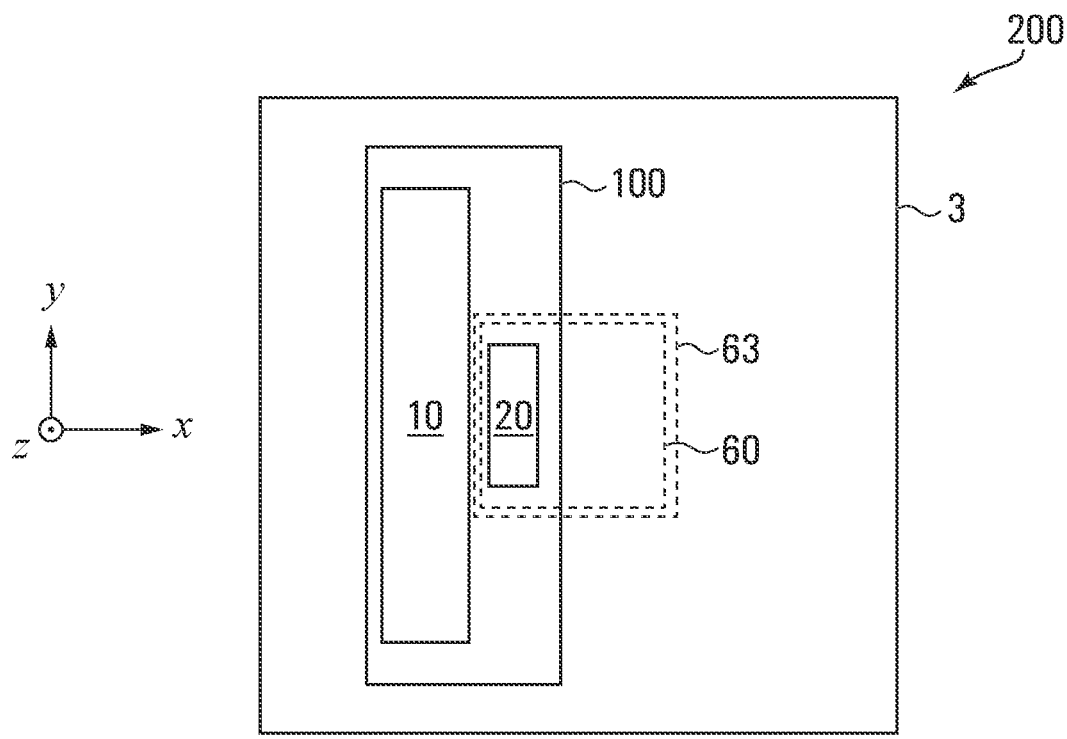
Figure 14C:
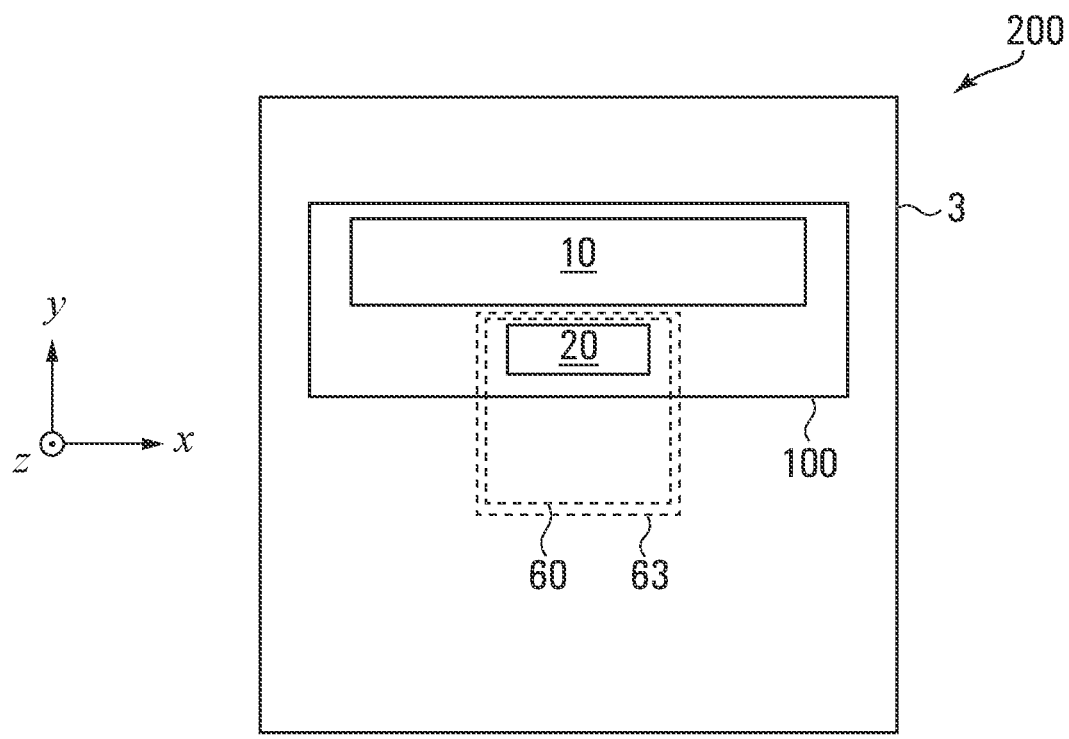
Figure 14D:
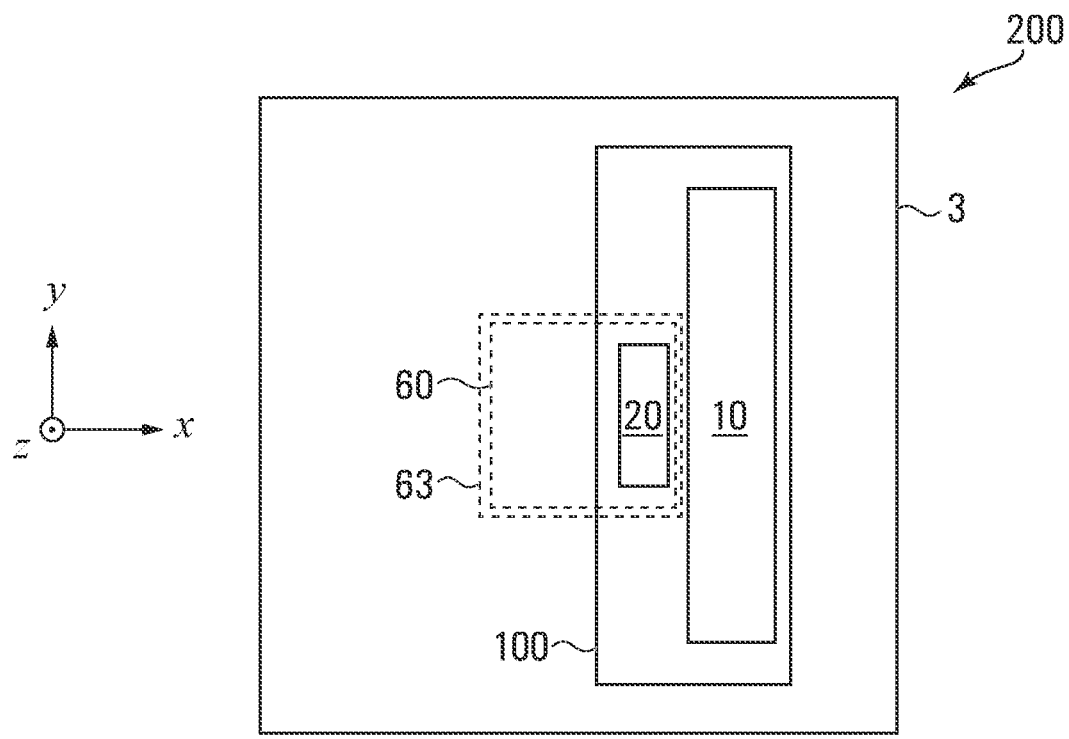

As show in FIG. 13, the controller 70 can be used transmit currents 54 into the actuation coil assembly 50, as well as one or more currents 64 into the stator coupling coil assembly 60. In some embodiments, it may be advantageous to turn off currents 54 when performing mover identification through the coupling between stator coupling coil assembly 60 and $2^{nd}$ MRU 20. This may minimize the disturbance caused by currents 54 in stator coupling coil assembly 60, so that the coupling between the $2^{nd}$ MRU 20 and the stator coupling coil assembly 60 may be maximized strongest. Similarly, it may be advantageous to turn off currents 64 when driving currents 54 into stator actuating coil assembly 50, in order to minimize the disturbance caused by currents 64 on the stator actuating coil assembly 50, so that the mover 100 may move smoothly during operation.

FIGS. 14A, 14B, 14C, and 14D show a particular embodiment in which the mover 100 has a rectangular footprint in the XY plane (e.g. in the plane of the stator working surface 3), and the $2^{nd}$ MRU 20 is positioned near one of the long edges of mover 100. In this arrangement, the $2^{nd}$ MRU 20 can be positioned inside the effective stator coupling region 63 for all mover orientations. Conversely, if the $2^{nd}$ MRU 20 is placed near one of the short edges of mover 100, then it may not be possible for the $2^{nd}$ MRU 20 to overlap with effective stator coupling region 63 without having mover 100 extending beyond the stator work surface 3.

In some embodiments, the stator coupling assembly 60 is positioned such that the XY center point of the stator coupling assembly 60 is roughly aligned with the XY center point of the stator 200 in the Z direction. This arrangement may accommodate different positions of the $2^{nd}$ MRU 20 on mover 100, such as placing $2^{nd}$ MRU 20 on the edge of the mover 100 or placing $2^{nd}$ MRU 20 in the center of mover 100. With the stator coupling assembly 60 positioned roughly in the XY center of the stator 200, it is possible to achieve strong coupling between $2^{nd}$ MRU 20 and stator coupling assembly 60 without making the mover 100 extend beyond the boundaries of the stator 200.

Figure 16A:
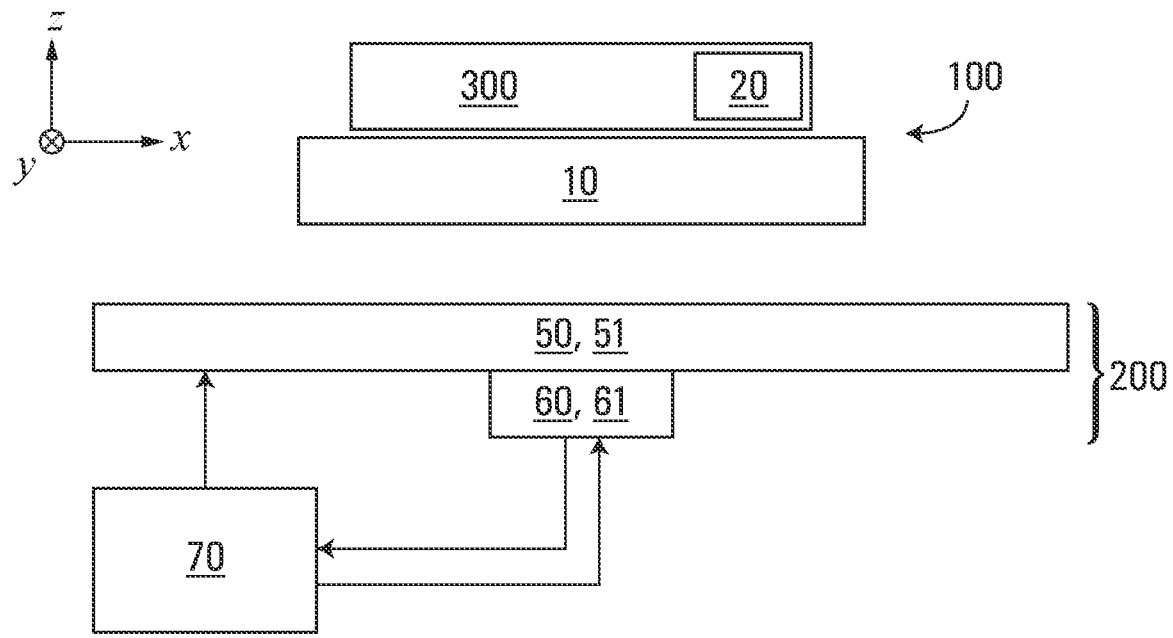
FIG. 16A shows a system including a stator, a controller, and a mover carrying a workpiece including a magnetically responsive unit, according to embodiments of the disclosure.
Figure 16B:
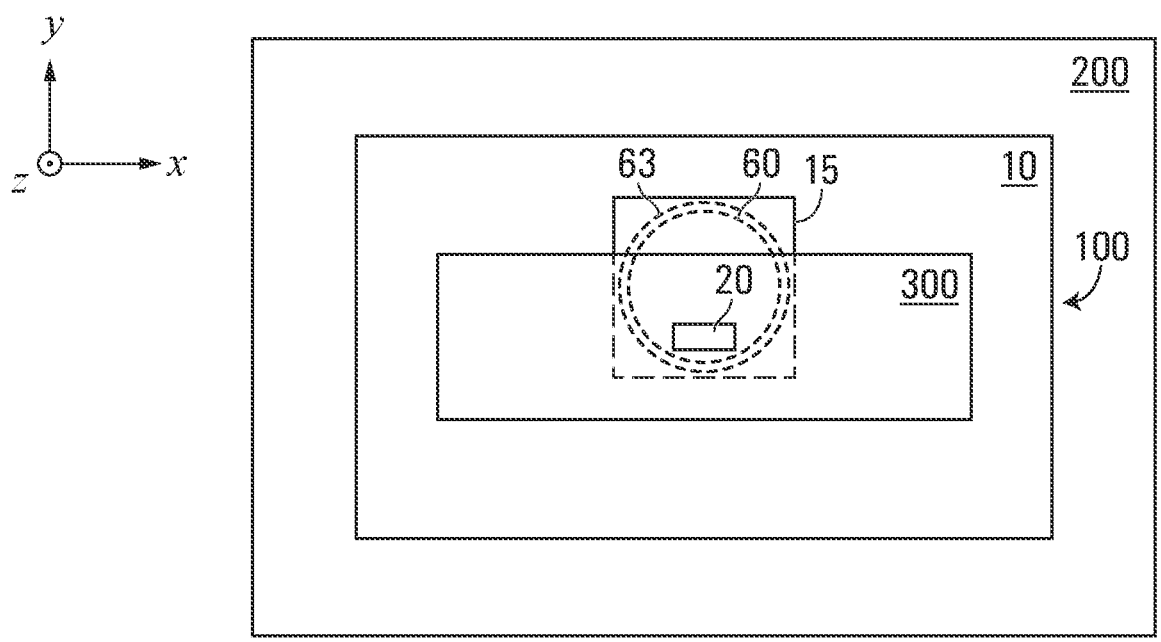
FIG. 16B shows a top plan view of the system of FIG. 17A.

In some embodiments, $2^{nd}$ MRU 20 may be incorporated into a workpiece 300 carried by mover 100, as shown in FIG. 16A, so that the workpiece 300 can be uniquely identified, regardless of which mover 100 is carrying the workpiece 300. In some embodiments, the mover 100 comprises a magnet-free region 15, so that the $2^{nd}$ MRU 20 placed in the workpiece 300 may overlap with the opening in the Z direction, to assist with the coupling between $2^{nd}$ MRU 20 and stator coupling assembly 60, as shown in FIG. 16B.

Figure 15:
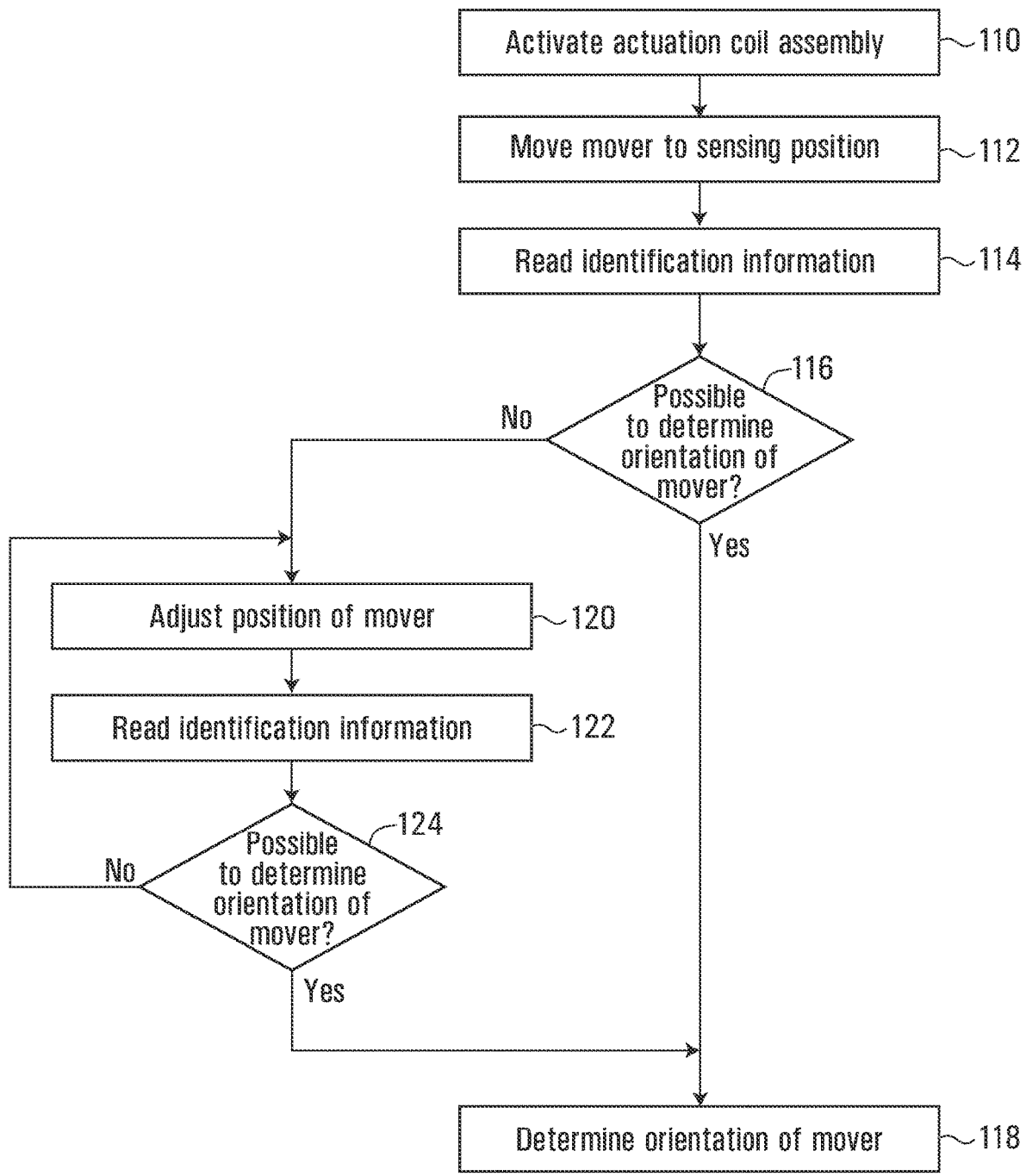
FIG. 15 shows a flow diagram of a method of identifying a mover and determining an orientation of the mover, according to embodiments of the disclosure.
Figure 17:
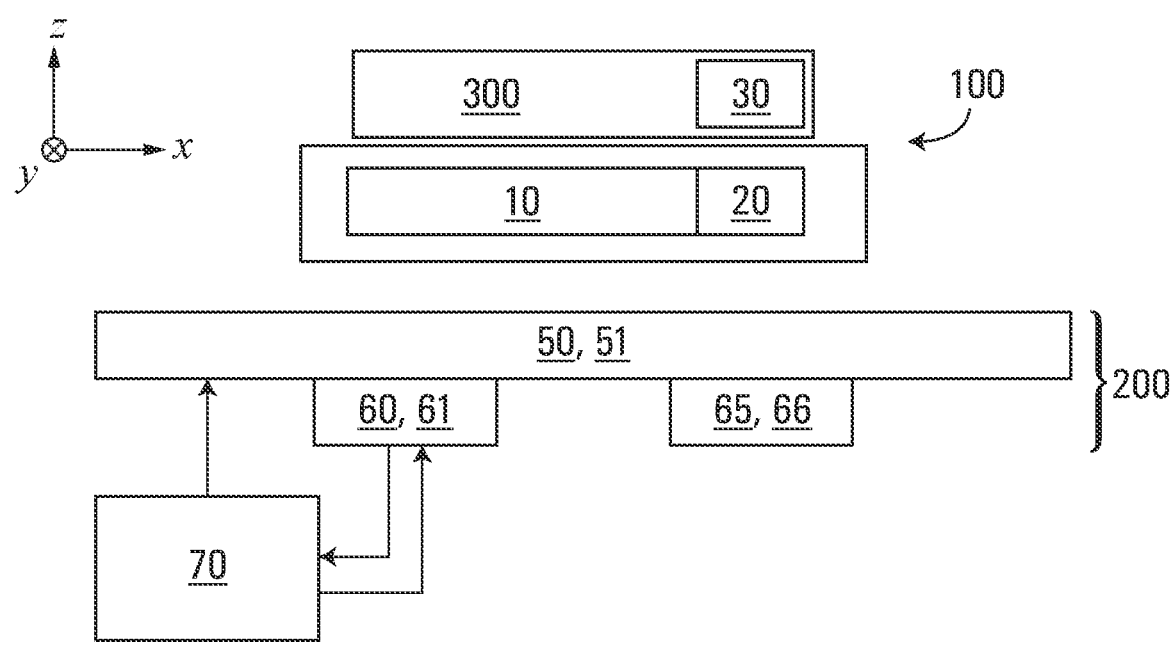
FIG. 17 shows a system including a stator, a controller, and a mover carrying a workpiece, according to embodiments of the disclosure.

In some embodiments, a $3^{rd}$ MRU 30 is incorporated into the workpiece 300 carried by the mover 100, as shown in FIG. 17. The $3^{rd}$ MRU 30 interacts with a $2^{nd}$ stator coupling coil assembly 65 in a similar fashion as the $2^{nd}$ MRU 20 interacts with the stator coupling coil assembly 60 described earlier. However, the $3^{rd}$ MRU is not configured to interact with stator coupling coil assembly 60, such that it is possible for the $2^{nd}$ stator coupling coil assembly 65 to interact only with the $3^{rd}$ MRU 30 in workpiece 300 without also interacting with the $2^{nd}$ MRU 20 in mover 100. For example, $2^{nd}$ stator coupling coil assembly 65 and $3^{rd}$ MRU 30 may be configured to interact using one or more frequencies different than those used by stator coupling coil assembly 60 when interacting with $2^{nd}$ MRU 20. Controller 70 may comprise a computer-readable medium having stored thereon computer program code which may be configured, when executed by one or more processors, to cause the one or more processors to perform any of the methods described herein. According to some embodiments, the computer program code, when read, may cause the one or more processors to perform the method now described in connection with FIG. 15. FIG. 15 shows a flow diagram of a method of identifying a mover, as well as determining an orientation of the mover.

At block 110, controller 70 activates actuation coil assembly 50. For example, controller 70 may cause current to flow through actuation coil circuits 51. At block 112, by driving actuation coil circuits 51, controller is able to move mover 100 over or on work surface 3, through the interaction of the magnetic fields generated by actuation coil circuits 51 with the magnetic components of mover 100. Mover 100 is moved to a sensing position, which may be a position in which a $2^{nd}$ MRU 20 of mover 20 overlaps effective stator coupling region 63. At block 114, identification information is read by controller 70. For example, controller 70 may drive coupling coil circuits 61 so as initiate the transfer of data from $2^{nd}$ MRU 20 to stator coupling assembly 60. Based on the identification information read by controller 70, controller 70 may identify mover 100.

Controller 70 may additionally determine the orientation of mover 100. In particular, at block 116, controller 70 determines whether it is possible based on the identification information obtained at block 114 to determine the orientation of mover 100. For example, the identification information may include information identifying a position of the $2^{nd}$ MRU 20 on mover 100. If it is possible to determine from the identification information the orientation of mover 100, then at block 118 controller 70 determines the orientation of mover 100. If it is not possible to determine from the identification information the orientation of mover 100, then at block 120 controller 70 adjusts a position of the mover 100. For example, through suitable driving of actuation coil circuits 51, controller 70 may cause the mover 100 to be repositioned in the X and/or Y directions such that another $2^{nd}$ MRU 20 of mover 100 overlaps effective stator coupling region 63. At block 122, identification information is read by controller 70. In particular, controller 70 drives coupling coil circuits 61 so as initiate the transfer of data from the other $2^{nd}$ MRU 20 to stator coupling assembly 60. At block 124, controller 70 determines whether it is possible based on the identification information of the other $2^{nd}$ MRU 20 to determine the orientation of mover 100. The process repeats until controller 70 is able to determine the orientation of mover 100.

According to some embodiments, the system may include more than one stator, with the stators positioned adjacent one another such a mover moving over or on the surface of a first one of the stators may be moved onto an adjacent one of the stators, such that the mover may then be moved over or on the adjacent stator.

According to some embodiments, the system may include more than one stator, with the stators positioned adjacent one another such a mover moving over or on the surface of a first one of the stators may be moved onto an adjacent one of the stators, such that the mover may then be moved over or on the adjacent stator.

According to some embodiments, the stator coupling coil circuits may be sized such that, for any given position of a mover on or over the work surface, at least a portion of the $2^{nd}$ MRU overlaps with at least a portion of the stator coupling coil circuits.

Throughout this description, it should be understood that a mover may carry one or more part(s), such as but not limited to more biological sample(s), device(s), one or more drugs possibly in suitable container(s), product(s) being assembled, raw part(s) or material(s), component(s), to meet the needs of a desired manufacturing purpose. Suitable tooling and/or material feeding mechanism may be installed or distributed along the sides of stators or over the stators from above, although these are not shown to avoid obscuring the description.

While a number of exemplary aspects and embodiments are discussed herein, those of skill in the art will recognize that the disclosure extends to any suitable modification, permutation, addition, and sub-combination thereof. For example:

In this description, although in some cases one or more parts are not shown on movers, it will be appreciated by those skilled in the art that each mover may carry one or more parts, components, containers, or the like.

In this description, elements (such as, by way of non-limiting example, stator layers, coil traces, moveable stages and/or magnet arrays) are said to overlap one another in or along a direction. When it is described that two or more objects overlap in or along a z-direction, for example, this usage should be understood to mean that a z-direction-oriented line could be drawn to intersect the two or more objects.

In some of the drawings and in the description provided herein, movers may be shown as being static with their mover-x, mover-y and mover-z axes being the same as the stator-x, stator-y and stator-z axes of the corresponding stator. This custom is adopted in this disclosure for the sake of brevity and ease of explanation. It will of course be appreciated from this disclosure that a mover can (and may be designed to) move with respect to its stator, in which case the mover-x, mover-y, and mover-z axes of the moveable stage may no longer be the same as (or aligned with) the stator-x, stator-y and stator-z axes of its stator. Directions, locations and planes defined in relation to the stator axes may generally be referred to as stator directions, stator locations and stator planes. Directions, locations and planes defined in relation to the mover axes may be referred to as mover directions, mover locations and mover planes.

In this description, references are made to controlling, controlling the motion of and/or controlling the position of moveable stages in or with multiple (e.g. 6) degrees of freedom. Unless the context or the description specifically indicates otherwise, controlling, controlling the motion of and/or controlling the position of moveable stages in or with multiple degrees of freedom may be understood to mean applying feedback position control in the multiple degrees of freedom, but does not expressly require that there be motion of the mover in any such degree of freedom.

In this description, a controllable force on a magnet array means that, by driving properly commutated current through a set of properly selected coils in a stator, a force can be generated with amplitude following a desired value in a direction through a plane. A plurality of independently controllable forces means that each of the plurality of forces can be generated to follow a command signal independent of the remainder of the forces, and any two forces of the plurality of forces are not collinear in space.

In this description, two in-plane DOF motion may mean independent translation motions in two non-parallel directions X and Y, both directions being orthogonal to the Z direction which is the direction normal to a top plane of the stator.

In this description, three in-plane DOF motion may mean independent translation motions in two non-parallel directions X and Y, plus rotational motion around the Z direction, where the Z direction is normal to a top plane of the stator, and both the X and Y directions are orthogonal to the Z direction.

In this description, 6 DOF motion means independent translation/rotational motion in the X, Y, and Z directions, and the Rx, Ry, Rz directions, where X and Y are non-parallel, X, Y, Z are not coplanar, and the Rx, Ry and Rz directions represent rotational directions around X, Y, and Z, respectively.

In this description, although many of the figures depict a single mover, it should be understood that multiple similar or different movers can work together and share a common stator.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A system comprising:
at least one magnetic mover including a first magnetic mover, wherein the first magnetic mover comprises at least one first magnetically responsive unit and at least one second magnetically responsive unit;
a stator defining a two-dimensional planar work surface and comprising:
a plurality of stator coils including at least one stator coupling coil operable to interact with the at least one second magnetically responsive unit;
one or more sensors for sensing a position of the first magnetic mover; and
one or more stator driving circuits for driving at least some of the stator coils to thereby move the first magnetic mover over the work surface,
wherein the at least one first magnetically responsive unit is positioned such that interaction of one or more magnetic fields emitted by the at least one first magnetically responsive unit with one or more magnetic fields generated by the at least some of the stator coils when driven by the one or more stator driving circuits enables movement of the first magnetic mover in at least two degrees of freedom, wherein the at least one stator coupling coil is configured to magnetically couple with the at least one second magnetically responsive unit for wirelessly transferring identification information from the at least one second magnetically responsive unit to the at least one stator coupling coil, and wherein the work surface separates the first magnetic mover from the at least one stator coupling coil.

2. The system of claim 1, wherein the stator is configured to wirelessly transfer energy from the stator to the first magnetic mover and wherein the transferred energy is used to facilitate the wireless transfer of the identification information from the second magnetically responsive unit to the at least one stator coupling coil.

3. The system of claim 2, wherein the one or more stator driving circuits are further configured to drive a current through the at least stator coupling coil to transfer the energy to the second magnetically responsive unit.

4. The system of claim 1, wherein the plurality of stator coils comprise:
an actuation coil assembly comprising a plurality of actuation coils comprising the at least some of the stator coils.

5. The system of claim 4, wherein one or more of a shape and a geometry of the at least one stator coupling coil is different from a respective one or more of a shape and a geometry of the plurality of actuation coils.

6. The system of claim 1, wherein the work surface separates the first magnetic mover from the plurality of stator coils.

7. The system of claim 1, wherein the work surface extends in an x-y plane, and wherein the at least two degrees of freedom comprise orthogonal x-axis and y-axis degrees of freedom.

8. The system of claim 1, wherein:
the at least one second magnetically responsive unit comprises at least one mover inductive coil.

9. The system of claim 8, wherein:
the one or more stator driving circuits comprise one or more coupling coil driving circuits for driving the at least one stator coupling coil such that the at least one stator coupling coil is configured to magnetically couple to the at least one mover inductive coil of the at least one second magnetically responsive unit.

10. The system of claim 1, wherein the one or more stator driving circuits are operable to drive the at least some of the stator coils at one or more frequencies different from one or more frequencies used to operate the at least one stator coupling coil, for reducing interference between the at least some of the stator coils and the at least one stator coupling coil.

11. The system of claim 1, wherein the at least two degrees of freedom comprise orthogonal x-axis, y-axis, and z-axis degrees of freedom, and respective rotational degrees of freedom about the x-axis, the y-axis, and the z-axis.

12. The system of claim 1, wherein the at least one second magnetically responsive unit comprises a plurality of second magnetically responsive units.

13. The system of claim 1, further comprising a controller communicatively coupled to the one or more sensors and operable to perform a method comprising:
activating the one or more stator driving circuits to drive the at least some of the stator coils so as to move the first magnetic mover over the work surface to a sensing position associated with a stator coupling coil of the at least one stator coupling coil;
activating the stator coupling coil for enabling interaction between the stator coupling coil and the at least one second magnetically responsive unit; and
after activating the stator coupling coil, identifying the first magnetic mover based on the identification information transmitted from the at least one second magnetically responsive unit to the stator coupling coil.

14. The system of claim 13, wherein the method further comprises determining an orientation of the first magnetic mover based on the transmitted identification information, wherein the orientation is an Rz orientation range.

15. The system of claim 13, wherein the sensing position comprises a position that is sufficiently close to the stator coupling coil so as to permit, for at least one orientation of the first magnetic mover, data transfer between the at least one second magnetically responsive unit and the stator coupling coil.

16. The system of claim 13, wherein:
activating the stator coupling coil for enabling interaction between the stator coupling coil and the at least one second magnetically responsive unit comprises:
activating the stator coupling coil;
thereafter, determining whether identification information has been transferred from the at least one second magnetically responsive unit to the stator coupling coil; and
if not, then adjusting a position of the first magnetic mover.

17. The system of claim 16, wherein adjusting the position of the first magnetic mover comprises translating the first magnetic mover to a new sensing position associated with the stator coupling coil.

18. The system of claim 16, wherein the method further comprises determining an orientation of the first magnetic mover based on identification information transmitted from the at least one second magnetically responsive unit to the stator coupling coil, and based on the adjusted position of the first magnetic mover.

19. The system of claim 13, wherein the at least one second magnetically responsive unit comprises a plurality of second magnetically responsive units, each second magnetically responsive unit being associated with unique identification information for the first magnetic mover, and wherein the method further comprises:
determining an orientation of the first magnetic mover based on identification information transmitted from at least one second magnetically responsive unit of the plurality of second magnetically responsive units to the stator coupling coil.

20. The system of claim 1, wherein the at least one stator coupling coil comprises a plurality of stator coupling coils, and wherein the at least one second magnetically responsive unit comprises a plurality of second magnetically responsive units positioned such that, when the first magnetic mover is in a sensing position associated with a stator coupling coil of the plurality of stator coupling coils, at least one second magnetically responsive unit of the plurality of second magnetically responsive units is sufficiently close to the stator coupling coil so as to permit data transfer between the at least one second magnetically responsive unit and the stator coupling coil.

21. The system of claim 1, wherein the at least one stator coupling coil comprises a plurality of stator coupling coils positioned such that, when the first magnetic mover is in a sensing position associated with a stator coupling coil of the plurality of stator coupling coils, the at least one second magnetically responsive unit is sufficiently close to the stator coupling coil so as to permit data transfer between the at least one second magnetically responsive unit and the stator coupling coil.

22. The system of claim 1, wherein the at least one second magnetically responsive unit is associated with identification information uniquely identifying the first magnetic mover.

23. The system of claim 1, wherein a center of the at least one second magnetically responsive unit is offset from a center of the at least one first magnetically responsive unit of the first magnetic mover.

24. The system of claim 1, wherein the at least one stator coupling coil has a size such that, for at least one position of the first magnetic mover on or over the work surface, at least a portion of the at least one second magnetically responsive unit overlaps with at least a portion of the at least one stator coupling coil.

25. The system of claim 1, wherein the at least one first magnetically responsive unit comprises multiple magnet arrays, each magnet array comprising multiple linearly elongated magnetization segments defining a direction of elongation, and wherein an axial direction of a magnetic core of the at least one second magnetically responsive unit is aligned with the direction of elongation defined by the linearly elongated magnetization segment closest to the at least one second magnetically responsive unit.

26. The system of claim 25, wherein each magnetization segment has a magnetization direction, wherein the axial direction of the magnetic core of the at least one second magnetically responsive unit is orthogonal to the magnetization direction of the magnetization segment closest to the magnetic core.

27. The system of claim 1, wherein the at least one second magnetically responsive unit comprises a magnetic core, wherein the at least one first magnetically responsive unit comprises multiple magnet arrays comprising a plurality of linearly elongated magnetization segments, wherein the linearly elongated magnetization segment closest to the at least one second magnetically responsive unit has first and second ends, and wherein one or more of:
  a distance separating the first end from a center of the magnetic core in an axial direction of the magnetic core is greater than a length of the magnetic core; and
  a distance separating the second end from the center of the magnetic core in the axial direction of the magnetic core is greater than the length of the magnetic core.

28. The system of claim 1, wherein the at least one second magnetically responsive unit comprises a magnetic core, wherein the at least one first magnetically responsive unit comprises multiple magnet arrays comprising a plurality of linearly elongated magnetization segments, wherein the linearly elongated magnetization segment closest to the at least one second magnetically responsive unit has first and second ends, and wherein one or more of:
  a distance separating the first end from a center of the magnetic core in an axial direction of the magnetic core is greater than about $1/3$ of a distance separating the first end from the second end; and
  a distance separating the second end from the center of the magnetic core in the axial direction of the magnetic core is greater than about $1/3$ of the distance separating the first end from the second end.

29. The system of claim 1, wherein the first magnetic mover comprises a magnetic robotic device carrying a workpiece, and wherein the at least one second magnetically responsive unit is comprised in the workpiece.

30. The system of claim 1, wherein the one or more magnetic components comprise multiple magnet arrays surrounding the at least one second magnetically responsive unit.

31. The system of claim 1, wherein the at least one second magnetically responsive unit comprises an inductive coil wound about a magnetic core.

32. The system of claim 1, wherein the at least one second magnetically responsive unit comprises a storage component storing identification information identifying the first magnetic mover.

33. A method comprising:
  providing a system comprising:
    at least one magnetic mover comprising a first magnetic mover, wherein the first magnetic mover comprises at least one first magnetically responsive unit and at least one second magnetically responsive unit;
    a stator defining a two-dimensional planar work surface and comprising:
      a plurality of stator coils including at least one stator coupling coil operable to interact with the at least one second magnetically responsive unit; and
      one or more stator driving circuits for driving at least some of the stator coils;
  transferring identification information from the at least one second magnetically responsive unit to the at least one stator coupling coil by magnetically coupling the at least one second magnetically responsive unit with the at least one stator coupling coil; and
  identifying the first magnetic mover based on the identification information,
  wherein the at least one first magnetically responsive unit is positioned such that interaction of one or more magnetic fields emitted by the at least one first magnetically responsive unit with one or more magnetic fields generated by the at least some of the stator coils when driven by the one or more stator driving circuits enables movement of the first magnetic mover in at least two degrees of freedom,
  and wherein the work surface separates the first magnetic mover from the at least one stator coupling coil.

34. The method of claim 33, further comprising wirelessly transferring energy from the stator to the first magnetic mover, wherein the transferred energy is used to facilitate the wireless transfer of the identification information from the second magnetically responsive unit to the at least one stator coupling coil.

35. The method of claim 34, further comprising transferring the energy from the at least one stator coupling coil to the second magnetically responsive unit.

36. The method of claim 33, wherein the plurality of stator coils comprise:
  an actuation coil assembly comprising a plurality of actuation coils comprising the at least some of the stator coils.

* * * * *